US008371502B1

(12) United States Patent
Galit et al.

(10) Patent No.: US 8,371,502 B1

(45) Date of Patent: Feb. 12, 2013

(54) SHOPPING CENTER GIFT CARD OFFER FULFILLMENT MACHINE, PROGRAM PRODUCT, AND ASSOCIATED METHODS

(75) Inventors: Scott H. Galit, New York, NY (US); Andrew B. Crowe, Omaha, NE (US)

(73) Assignee: Metabank, Sioux Falls, SD (US)

( * ) Notice: Subject to any disclaimer, the term of this patent is extended or adjusted under 35 U.S.C. 154(b) by 481 days.

(21) Appl. No.: 12/607,780

(22) Filed: Oct. 28, 2009

Related U.S. Application Data

(60) Provisional application No. 61/109,022, filed on Oct. 28, 2008.

(51) Int. Cl.
*G06K 5/00* (2006.01)

(52) U.S. Cl. ......................... 235/380; 235/492; 235/487

(58) Field of Classification Search ........................ None
See application file for complete search history.

(56) References Cited

U.S. PATENT DOCUMENTS 3,752,904 A 8/1973 Waterbury
4,247,759 A 1/1981 Yuris et al.
4,334,307 A 6/1982 Bourgeois et al.
4,439,636 A 3/1984 Newkirk et al.
4,449,040 A 5/1984 Matsuoka et al.
4,528,643 A 7/1985 Freeny, Jr.
4,532,416 A 7/1985 Berstein
4,577,061 A 3/1986 Katzaff et al.
4,625,276 A 11/1986 Benton et al.
4,677,565 A 6/1987 Ogaki et al.
4,678,895 A 7/1987 Tateisi et al.
4,706,275 A 11/1987 Kamil
4,722,054 A 1/1988 Yorozu et al.
4,727,243 A 2/1988 Savar
4,750,201 A 6/1988 Hodgson et al.
4,797,540 A 1/1989 Kimizu
4,827,113 A 5/1989 Rikuna
4,868,900 A 9/1989 McGuire
4,877,947 A 10/1989 Mori
4,879,744 A 11/1989 Tasaki et al.
4,884,212 A 11/1989 Stutsman
(Continued)

FOREIGN PATENT DOCUMENTS

EP 0348932 1/1990
EP 0397512 11/1990
(Continued)

OTHER PUBLICATIONS

Congressional Budget Office, “Emerging Electronic Methods for Making Payments” (Jun. 1996), CBO.

(Continued)

*Primary Examiner* — Thien M Le
*Assistant Examiner* — Sonji Johnson
(74) *Attorney, Agent, or Firm* — Bracewell & Giuliani, LLP

(57) ABSTRACT

Exemplary embodiments provide for offer fulfillment utilizing a shopping center gift card and an offer fulfillment machine. A cardholder obtains the gift card and registers with an issuer to receive offers, discounts, and promotions electronically. The machine activates the gift card’s offer purse, a subaccount associated with an offer. The machine notifies a cardholder of the promotional offer. To redeem an offer, the cardholder presents the gift card as payment to a merchant. No coupons are necessary. No change to the merchant’s POS terminal is necessary. The machine matches, in memory, the offer purse to a standard transaction approval request. The machine determines eligibility for the promotion and updates an amount associated with the offer purse to thereby satisfy at least in part from the offer purse the standard transaction approval request. A purchase purse, another gift card subaccount, can optionally provide any remaining amount for the transaction.

20 Claims, 15 Drawing Sheets

1000
Issuing a card 1001
Crediting a first amount to a first purse defining a purchase purse 1002
Receiving cardholder registration information 1003
Crediting a second amount associated with a promotional offer to a second purse defining an offer purse 1004
Sending the promotional offer to the cardholder electronically 1005
Receiving a standard network transaction responsive to a cardholder presenting the card at a participating merchant 1006
Assessing transaction parameters for offer eligibility 1007
Debiting the offer purse for the offer amount 1008
Debiting the purchase purse for any remaining amount 1009
Paying the merchant full price via a standard network settlement process 1010
Providing balance information to the card holder electronically 1011
Settling with the merchant for discount and processing fees 1012

U.S. PATENT DOCUMENTS 4,951,308 A 8/1990 Bishop et al.
4,968,873 A 11/1990 Dethloff et al.
5,012,077 A 4/1991 Takano
5,048,085 A 9/1991 Abraham et al.
5,050,207 A 9/1991 Hitchcock
5,068,891 A 11/1991 Marshall
5,101,098 A 3/1992 Naito
5,138,650 A 8/1992 Stahl et al.
5,146,067 A 9/1992 Sloan et al.
5,148,481 A 9/1992 Abraham et al.
5,155,342 A 10/1992 Urano
5,163,086 A 11/1992 Ahearn et al.
5,192,947 A 3/1993 Neustein
5,220,593 A 6/1993 Zicker et al.
5,221,838 A 6/1993 Gutman et al.
5,225,666 A 7/1993 Amarena et al.
5,264,689 A 11/1993 Maes et al.
5,265,155 A 11/1993 Castro
5,266,782 A 11/1993 Alanara et al.
5,272,320 A 12/1993 Hakamada
5,278,752 A 1/1994 Narita et al.
5,285,382 A 2/1994 Muehlberger et al.
5,327,482 A 7/1994 Yamamoto
5,334,821 A 8/1994 Campo et al.
5,340,969 A 8/1994 Cox
5,352,876 A 10/1994 Watanabe et al.
5,359,182 A 10/1994 Schilling
5,409,092 A 4/1995 Itako et al.
5,416,306 A 5/1995 Imahata
5,438,186 A 8/1995 Nair et al.
5,442,567 A 8/1995 Small
5,448,044 A 9/1995 Price et al.
5,465,206 A 11/1995 Hilt et al.
5,477,038 A 12/1995 Levine et al.
5,504,808 A 4/1996 Hamrick, Jr.
5,511,114 A 4/1996 Stimson et al.
5,513,117 A 4/1996 Small
5,550,358 A 8/1996 Tait et al.
5,577,109 A 11/1996 Stimson et al.
5,577,121 A 11/1996 Davis et al.
5,661,254 A 8/1997 Steuer et al.
5,696,908 A 12/1997 Muehlberger et al.
5,699,528 A 12/1997 Hogan
5,732,136 A 3/1998 Murphree et al.
5,814,798 A 9/1998 Zancho
5,841,365 A 11/1998 Rimkus
5,859,419 A 1/1999 Wynn
5,870,721 A 2/1999 Norris
5,875,437 A 2/1999 Atkins
5,878,141 A 3/1999 Daly et al.
5,893,907 A 4/1999 Ukuda
5,897,620 A 4/1999 Walker et al.
5,920,848 A 7/1999 Schutzer et al.
5,923,016 A 7/1999 Fredregill et al.
5,933,812 A 8/1999 Meyer et al.
5,963,921 A 10/1999 Longfield
6,000,608 A 12/1999 Dorf
6,012,635 A 1/2000 Shimada et al.
6,021,397 A 2/2000 Jones et al.
6,032,859 A 3/2000 Muehlberger et al.
6,041,308 A 3/2000 Walker et al.
6,065,679 A 5/2000 Levie et al.
6,112,191 A 8/2000 Burke
6,144,948 A 11/2000 Walker et al.
6,154,738 A 11/2000 Call
6,189,787 B1 2/2001 Dorf
6,208,978 B1 3/2001 Walker et al.
6,249,773 B1 6/2001 Allard et al.
6,253,998 B1 7/2001 Ziamo
6,304,860 B1 10/2001 Martin et al.
6,315,193 B1 11/2001 Hogan
6,450,407 B1 * 9/2002 Freeman et al. .............. 235/492
6,467,684 B2 10/2002 Fite et al.
6,704,714 B1 3/2004 O'Leary et al.
6,739,506 B1 5/2004 Constantine
6,865,544 B1 3/2005 Austin
6,920,434 B1 7/2005 Cossette
6,999,943 B1 2/2006 Johnson et al.
7,010,507 B1 3/2006 Anderson et al.
7,031,939 B1 4/2006 Gallagher et al.
7,072,862 B1 7/2006 Wilson
7,127,452 B1 10/2006 Yashiro
7,177,829 B1 2/2007 Wilson
7,206,761 B2 4/2007 Colvin
7,252,223 B2 8/2007 Schofield
7,258,273 B2 8/2007 Griffin
7,370,076 B2 5/2008 Friedman et al.
7,398,919 B2 7/2008 Cooper
7,426,492 B1 9/2008 Bishop et al.
7,451,920 B1 11/2008 Rose
7,472,089 B2 12/2008 Hu et al.
7,493,279 B1 2/2009 Kwan
7,509,286 B1 3/2009 Bent et al.
7,546,945 B1 6/2009 Bucci et al.
7,567,936 B1 7/2009 Peckover et al.
7,599,879 B2 10/2009 Louie et al.
7,606,918 B2 10/2009 Holzman et al.
7,607,570 B1 10/2009 Constantine
7,628,319 B2 12/2009 Brown et al.
7,653,591 B1 1/2010 Dabney
7,702,583 B1 4/2010 Hamilton et al.
7,702,587 B2 4/2010 Nguyen et al.
7,757,944 B2 7/2010 Cline et al.
7,783,571 B2 8/2010 Fish et al.
7,792,717 B1 9/2010 Hankins et al.
7,810,735 B2 10/2010 Madani
7,813,955 B2 10/2010 Ariff et al.
7,814,012 B2 10/2010 Johnson
7,865,434 B2 1/2011 Sheets
7,873,569 B1 1/2011 Cahn
7,899,750 B1 3/2011 Klieman et al.
7,904,333 B1 3/2011 Perkowski
7,933,833 B2 4/2011 Hotz et al.
7,954,704 B1 6/2011 Gephart et al.
8,024,242 B2 9/2011 Galit
8,046,256 B2 10/2011 Chien et al.
8,051,006 B1 11/2011 Rourk
8,055,557 B2 11/2011 Sorbe et al.
8,065,187 B2 11/2011 Ahlers et al.
8,069,085 B2 11/2011 Ahlers et al.
8,086,494 B2 12/2011 Dooley et al.
8,090,649 B2 1/2012 Galit et al.
8,103,549 B1 1/2012 Ahlers et al.
8,108,272 B2 1/2012 Sorbe et al.
8,108,279 B2 1/2012 Galit et al.
8,108,977 B1 2/2012 Miller
8,150,764 B2 4/2012 Crowe et al.
8,214,286 B1 7/2012 Galit et al.
8,244,611 B2 8/2012 Galit
8,244,637 B2 8/2012 Galit et al.
2001/0021925 A1 9/2001 Ukigawa et al.
2001/0034663 A1 10/2001 Teveler et al.
2001/0034676 A1 10/2001 Vasic
2001/0042785 A1 11/2001 Walker et al.
2002/0002075 A1 1/2002 Rowe
2002/0032612 A1 3/2002 Williams et al.
2002/0038285 A1 3/2002 Golden et al.
2002/0042744 A1 4/2002 Kohl
2002/0055904 A1 5/2002 Mon
2002/0055909 A1 5/2002 Fung et al.
2002/0077971 A1 6/2002 Allred
2002/0107797 A1 8/2002 Combaluzier
2002/0152161 A1 10/2002 Aoike
2002/0194122 A1 12/2002 Knox et al.
2002/0194124 A1 12/2002 Hobbs et al.
2003/0004997 A1 1/2003 Parker et al.
2003/0055782 A1 3/2003 Slater
2003/0061170 A1 3/2003 Uzo
2003/0074311 A1 4/2003 Saylors et al.
2003/0097331 A1 5/2003 Cohen
2003/0135459 A1 7/2003 Abelman et al.
2003/0144935 A1 7/2003 Sobek
2003/0158811 A1 8/2003 Sanders et al.
2003/0167225 A1 9/2003 Adams
2003/0191702 A1 10/2003 Hurley
2003/0191714 A1 10/2003 Norris
2003/0197059 A1 10/2003 Tidball et al.

2003/0200118 A1 10/2003 Lee et al.
2003/0208443 A1 11/2003 Mersky
2003/0217003 A1 11/2003 Weinflash et al.
2004/0036215 A1 2/2004 Butler, II
2004/0047459 A1 3/2004 Diaz
2004/0098351 A1 5/2004 Duke
2004/0111370 A1 6/2004 Saylors et al.
2004/0117250 A1 6/2004 Lubow et al.
2004/0117302 A1 6/2004 Weichert et al.
2004/0133515 A1 7/2004 McCoy et al.
2004/0143527 A1 7/2004 Benkert et al.
2004/0148252 A1 7/2004 Fleishman
2004/0153407 A1 8/2004 Clubb et al.
2004/0199463 A1 10/2004 Deggendorf
2004/0210484 A1 10/2004 Lee
2004/0211830 A1* 10/2004 Algiene ........................ 235/379
2004/0215554 A1 10/2004 Kemper et al.
2004/0225545 A1 11/2004 Turner et al.
2004/0230523 A1 11/2004 Johnson
2004/0235542 A1 11/2004 Stronach et al.
2004/0236646 A1 11/2004 Wu et al.
2005/0004839 A1 1/2005 Bakker et al.
2005/0015332 A1 1/2005 Chen
2005/0021363 A1 1/2005 Stimson et al.
2005/0075939 A1 4/2005 Bao et al.
2005/0082364 A1 4/2005 Alvarez et al.
2005/0108121 A1 5/2005 Gravett et al.
2005/0167481 A1 8/2005 Hansen et al.
2005/0167487 A1 8/2005 Conlon et al.
2005/0173520 A1 8/2005 Jaros et al.
2005/0177489 A1 8/2005 Neff et al.
2005/0203837 A1 9/2005 Leigh et al.
2005/0205663 A1 9/2005 Allgiene
2005/0228724 A1 10/2005 Frangiosa
2005/0278188 A1 12/2005 Thomson et al.
2005/0278347 A1 12/2005 Wolf et al.
2005/0283436 A1 12/2005 Greer et al.
2006/0059085 A1 3/2006 Tucker
2006/0085269 A1 4/2006 Guilfoyle
2006/0085334 A1 4/2006 Murphy
2006/0149665 A1 7/2006 Weksler
2006/0149670 A1 7/2006 Nguyen et al.
2006/0161499 A1 7/2006 Rich et al.
2006/0190322 A1 8/2006 Oehlerking et al.
2006/0206402 A1 9/2006 Sullivan
2006/0212392 A1 9/2006 Brown
2006/0212393 A1 9/2006 Brown
2006/0224502 A1 10/2006 McGowan
2006/0249570 A1 11/2006 Seifert et al.
2006/0259957 A1 11/2006 Tam et al.
2006/0282356 A1 12/2006 Andres et al.
2006/0282374 A1 12/2006 Stone
2006/0293966 A1 12/2006 Inouye
2007/0000997 A1 1/2007 Lambert et al.
2007/0011089 A1 1/2007 DeSchryver
2007/0038515 A1 2/2007 Postrel
2007/0038924 A1 2/2007 Beyer et al.
2007/0045401 A1 3/2007 Sturm
2007/0061206 A1 3/2007 LeFebvre
2007/0083462 A1 4/2007 Cubillo et al.
2007/0087819 A1 4/2007 Van Luchene et al.
2007/0090183 A1 4/2007 Hursta et al.
2007/0100745 A1 5/2007 Keiser
2007/0100746 A1 5/2007 Blair et al.
2007/0106603 A1 5/2007 Whyte et al.
2007/0136194 A1 6/2007 Sloan
2007/0152038 A1 7/2007 Ciancio et al.
2007/0168265 A1 7/2007 Rosenberger
2007/0174189 A1 7/2007 Bishop et al.
2007/0175982 A1 8/2007 Bonalle et al.
2007/0175984 A1 8/2007 Khandaker et al.
2007/0198352 A1 8/2007 Kannegiesser
2007/0198354 A1 8/2007 Senghore et al.
2007/0198403 A1 8/2007 Aloni et al.
2007/0233596 A1 10/2007 Ambrose
2007/0244778 A1 10/2007 Bailard
2007/0250380 A1 10/2007 Mankoff
2007/0260536 A1 11/2007 Stone
2007/0262140 A1 11/2007 Long, Sr.
2007/0265957 A1 11/2007 Advani et al.
2007/0265960 A1 11/2007 Advani et al.
2007/0267479 A1 11/2007 Nix et al.
2007/0271178 A1 11/2007 Davis
2007/0276736 A1 11/2007 Guilfoyle
2007/0282740 A1 12/2007 Wendt
2008/0005001 A1 1/2008 Davis et al.
2008/0021772 A1 1/2008 Aloni et al.
2008/0040261 A1 2/2008 Nix et al.
2008/0040265 A1 2/2008 Rackley et al.
2008/0052189 A1 2/2008 Walker et al.
2008/0059363 A1 3/2008 Hotz et al.
2008/0065532 A1 3/2008 De la Motte
2008/0091519 A1 4/2008 Foss
2008/0103968 A1* 5/2008 Bies et al. ....................... 705/39
2008/0103970 A1 5/2008 Books
2008/0120129 A1 5/2008 Seubert et al.
2008/0140561 A1 6/2008 Neel
2008/0140568 A1 6/2008 Henry
2008/0162271 A1 7/2008 Benjamin
2008/0210753 A1 9/2008 Plozay et al.
2008/0228643 A1 9/2008 Hall
2008/0235095 A1 9/2008 Oles et al.
2008/0270298 A1 10/2008 McElroy et al.
2008/0281734 A1 11/2008 Longe et al.
2008/0294977 A1 11/2008 Friedman et al.
2008/0301162 A1 12/2008 Wall et al.
2009/0048963 A1 2/2009 Bishop et al.
2009/0061929 A1 3/2009 Evans
2009/0063297 A1 3/2009 Dooley et al.
2009/0063342 A1 3/2009 Beckers
2009/0063351 A1 3/2009 Schmeyer et al.
2009/0157220 A1 6/2009 Walker et al.
2009/0164351 A1 6/2009 Sorbe et al.
2009/0164362 A1 6/2009 Moore
2009/0164363 A1 6/2009 Ahlers
2009/0171775 A1 7/2009 Cashion et al.
2009/0192934 A1 7/2009 Chu et al.
2009/0222367 A1 9/2009 Jenkins et al.
2009/0228307 A1 9/2009 Sorbe
2009/0254431 A1 10/2009 Crowe et al.
2010/0030687 A1 2/2010 Panthaki et al.
2010/0057554 A1 3/2010 Lanford
2010/0057609 A1 3/2010 Sibson
2010/0076836 A1* 3/2010 Giordano et al. .......... 705/14.38
2010/0076875 A1 3/2010 Ernst et al.
2010/0106555 A1 4/2010 Mneimneh et al.
2010/0222132 A1 9/2010 Sanford et al.
2010/0280949 A1 11/2010 Van Rensburg
2010/0306104 A1 12/2010 Johnson
2010/0312684 A1 12/2010 Kemper et al.
2011/0047039 A1 2/2011 Crames et al.
2011/0106698 A1 5/2011 Isaacson et al.
2011/0270664 A1 11/2011 Jones

FOREIGN PATENT DOCUMENTS

EP 0397512 A2 11/1990
EP 0619565 10/1994
EP 0619565 A1 10/1994
EP 0348932 A2 5/1995
JP 2-238593 9/1990
JP 2-238593 A 9/1990
JP 2-278495 11/1990
JP 2-278495 A 11/1990
JP 3-100791 4/1991
JP 3-100791 A 4/1991
JP 4-165588 6/1992
JP 4-165588 A 6/1992
KR 2010010217 2/2010
WO WO 86/02757 A1 5/1986
WO WO8602757 5/1986
WO WO 86/07647 A1 12/1986
WO WO8607647 12/1986
WO WO 88/03297 A1 5/1988
WO WO8803297 5/1988
WO WO 89/08899 A1 9/1989
WO WO8908899 9/1989
WO WO 91/09370 A1 6/1991
WO WO9109370 6/1991

| | | | |
|---|---|---|---|
| WO | WO 93/09515 | A1 | 5/1993 |
| WO | WO9309515 | | 5/1993 |
| WO | WO 94/10649 | A1 | 5/1994 |
| WO | WO9410649 | | 5/1994 |
| WO | WO 94/28498 | A1 | 12/1994 |
| WO | WO9428498 | | 12/1994 |
| WO | WO 95/03570 | A2 | 2/1995 |
| WO | WO9503570 | | 2/1995 |
| WO | WO 97/46986 | A1 | 12/1997 |
| WO | WO9746986 | | 12/1997 |
| WO | WO0060487 | | 10/2000 |
| WO | WO2007133315 | A2 | 11/2007 |
| WO | 2008102329 | A2 | 8/2008 |
| ZA | 200709282 | | 10/2007 |

OTHER PUBLICATIONS

Coady et al., “Targeted anti-poverty intervention: A selected annotated bibliography” (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecomm Point-of-Sale Activated Cards; All Q Comm VeriFone Merchants Can Now Deliver Durable Calling Cards (Dec. 6, 2010), Business Wire (Dec. 8, 2011).
Notice of Allowance from co-pending U.S. Appl. No. 12/465,803 dated Dec. 20, 2011.
MasterCard Electronic prepaid (Oct. 2003). The Nilson Report, (798), (Dec. 9, 2011) The Banking Source (Document ID 474833171).
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
VeriFone TCL Terminal Control Language Programmer’s Manual, VeriFone Part No. 00368-01, Revision G, Manual Revision 8.0, Aug. 1992, 362 pages.
VeriFone Tranz 330 Reference Manual, Verifone Part No. 00483-Revision D, Manual Revision 3.01, Apr. 1990, 144 pages.
MicroTrax Ltd. Omni 490M (and 490ML) Operation Manual for Integrated and Non-Integrated Configurations, 1994, 60 pages.
MicroTrax Electronic Payment Systems: The MicroTrax Pinstripe Lane Equipment Users Guide, MicroTrax Ltd., Newport Beach, CA 1991, 54 pages.
IBM 4680-4690 Supermarket Application—Electronic Funds Transfer Feature Enhancement: User’s Guide, IBM Corp., Research Triangle Park, NC, Sep. 1995, 318 pages.
IBM 4680 General Sales Application Electronic Funds Transfer User’s Guide, IBM Corp., Research Triangle Park, NC, Dec. 1990, 260 pages.
IBM 4680 General Sales Application Electronic Funds Transfer User’s Guide, IBM Corp., Research Triangle Park, NC, Mar. 1991, 263 pages.
IBM 4680 General Sales Application: Guide to Operations, Research Triangle Park, NC, Jun. 1991, 429 pages.
Office Action dated Mar. 4, 2011, in co-pending U.S. Appl. No. 12/338,684.
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
Office Action in co-pending U.S. Appl. No. 12/417,162 dated Apr. 13, 2011.
Office Action in co-pending U.S. Appl. No. 12/609,896 dated Apr. 5, 2011.
Orszag, Peter, “Unemployment Insurance as an Economic Stimulus”, Center for Budget and Policy Priorities, Nov. 15, 2011.
Powell, Robert L., “Statewide Electronic Commerce Program Status Report”, State of North Carolina Office of the State Controller, Mar. 7, 2007.
Parrott, James, “Jittery Wall Street, Calm City?”, Gotham Gazette, Apr. 16, 2007.
Zandi, Mark, “Washington Throws the Economy a Rope”, Moody’s Economy.com, Jan. 22, 2008.
Blair, Christine E., et al., “Challenges to the Dual Banking System: The Funding of Bank Supervision”, FDIC Bank Review, Mar. 31, 2006.
Office Action for co-pending U.S. Appl. No. 12/367,187 dated Jun. 27, 2011.
“Developing Asia and the World”, Asian Development Bank 2002.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1, 2009 at 5:50pm, HSBC Offshore Internet Banking.
Financial Advice Investment Money Oct. 1, 2009 at 7:25am, HSBC Offshore Internet Banking.
Office action from co-pending U.S. Appl. No. 12/338,497 dated Aug. 18, 2011.
Notice of Allowance of co-pending U.S. Appl. No. 12/417,199 dated Aug. 18, 2011.
Notice of Allowance of co-pending U.S. Appl. No. 12/417,211 dated Aug. 22, 2011.
Wolfe, Daniel, “An E-Variation on Payday Loan Theme”, American Banker, Jul. 28, 2005.
“Letter of Credit Explained: What is Letter of Credit?”, Dec. 26, 2005, pp. 1-2 (cited in Office Action from co-pending U.S. Appl. No. 12/338,540 dated Sep. 1, 2011).
Office Action from co-pending U.S. Appl. No. 12/338,540 dated Sep. 1, 2011.
Notice of Allowance of co-pending U.S. Appl. No. 12/338,365 dated Sep. 1, 2011.
Office Action dated Jul. 9, 2010 for U.S. Appl. No. 12/338,365.
Office Action dated Jul. 9, 2010 for U.S. Appl. No, 12/338,645.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, “120% rate for Wells’ Advances”, Oct. 16, 2004, San Francisco Chronicle (cited in Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.
United Nations Conference on Trade and Development, E-finance and Small and Medium-Size Enterprises (SMEs) in Developing and Transition Economies, UNCTAD Expert Meeting, Oct. 17, 2001.
Tim Jones, Paradigms loast, RSA Journal, Oct. 2006, pp. 28-31.

Diego Rumiany, Internet Bidding for Microcredit: making it work in the developed world, conceiving it for the developing world, Mar. 2007.
Stefan Heng, Thomas Meyer, and Antje Stobbe, Implications of Web 2.0 for financial institutions: Be a driver, not a passenger, Munich Personal RePEc Archive, Jul. 31, 2007.
Matt Flannery, Kiva and the Birth of Person to Person Microfinance, Innovations, pp. 31-56, Winter & Spring 2007.
Michael K, Hulme and Colette Wright, Internet Based Social Lending: Past, Present and Future, Social Futures Observatory, Oct. 2006.
Richard W. Coleman, Is the Future of the Microfinance Movement to be Found on the Internet?, International Trade and Finance Association Working Papers 2007.
Amanda Scott and Patrick Towell, The web we weave, Financial World, pp. 12-15, Nov. 2006.
Prosper, Access and Transparency through Person-to-Person Lending, FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments from Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/338,365, filed Dec. 18, 2008, titled "Transfer Account Systems, Computer Program Products, and Associated Computer-Implemented Methods".
Co-pending U.S. Appl. No. 12/397,113, filed Mar. 3, 2009, titled "Person-to-Person Lending Program Product, System, and Associated Computer-Implemented Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,306, filed May 13, 2009, titled "System, Program Product, and Computer-Implemented Method for Loading a Loan on an Existing Pre-Paid Card".
Co-pending U.S. Appl. No. 12/465,803, filed May 14, 2009, titled "System, Program Product, and Method for Loading a Loan on a Pre-Paid Card".
Co-pending U.S. Appl. No. 12/465,277, filed May 13, 2009, titled "System, Program Product, and Computer-Implemented Method for Loading a Loan on a Pre-Paid Card".
Cross, Sam Y., All About . . . the Foreign Exchange Market in the United States, 1998, Federal Reserve Sank of New York.
International Search Report from co-pending PCT Application No. PCT/US2009/034692 dated Apr. 14, 2009.
International Search Report from co-pending PCT Application No. PCT/US2009/039495 dated May 18, 2009.
International Search Report from co-pending PCT Application No. PCT/US2008/087689 dated Jun. 17, 2009.
International Search Report from co-pending PCT Application No. PCT/US2009/039492 dated May 14, 2009.
International Search Report from co-pending PCT Application No. PCT/US2009/043988 dated Jul. 14, 2009.
International Search Report from co-pending PCT Application No. PCT/US2009/039512 dated Jun. 8, 2009.
International Search Report from co-pending PCT Application No. PCT/US2009/039504 dated May 27, 2009.
International Search Report from co-pending PCT Application No, PCT/US2009/043978 dated Jun. 30, 2009.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Method, and Program Product for Retail Activation and Reload Associated with Partial Authorization Transaction".
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20,2011.
Office Action from co-pending U.S. Appl. No. 12/562,331 dated Oct. 20, 2011.
Notice of Allowance from co-pending U.S. Appl. No. 12/407,320 dated Oct. 18, 2011.
Office Action from co-pending U.S. Appl. No. 12/626,349, dated Nov. 22, 2011.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Final Office Action for co-pending U.S. Appl. No. 12/338,540 dated Mar. 15, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
Ex-parte Quayle Action for co-pending U.S. Appl. No. 12/700,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.

Office Action for co-pending U.S. Appl. No. 12/465,306 dated Nov. 10, 2011.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Actiond dated Feb. 1, 2011, in co-pending U.S. Appl. No. 12/389,749.
Co-pending U.S. Appl. No. 12/814,405, filed Jun. 11, 2010 titled Environmental-Friendly Fuel Credit Card System, Program Product, and Computer-Implemented Methods.
Co-pending U.S. Appl. No. 12/877,490, filed Sep. 8, 2010 titled System, Program Product, and Method for Debit Card and Checking Account Autodraw.
Co-pending U.S. Appl. No. 12/877,524, filed Sep. 8, 2010 titled System, Program Product, and Method for Debit Card and Checking Account Autodraw.
Co-pending U.S. Appl. No. 12/562,331, filed Sep. 18, 2009 titled Computerized Extension of Credit to Existing Demand Deposit Accounts, Prepaid Cards and Lines of Credit Based on Expected Tax Refund Proceeds, Associated Systems and Computer Program Products.
Krino, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.
Bank of Boulder POS Debit Solution at the Table Now in Beta: First Bank to Certify IVI Spirit C2000 on MAPP (R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-pending U.S. Appl. No. 12/731,852, filed Mar. 25, 2010.
Microtrax Ltd., PC Electronic Payment Systems Reference Manuel, 1995 (381 pages).
John P. Caskey and Gordon H. Selton, Jr., Is the Debit Card Revolution Finally Here?, Federal Reserve Bank of Kansas City, Economic Review, Fourth Quarter 1994, pp. 70-95, vol. 73 #4 (17 pages).
Laura Castaneda, Business Promote Services to Customers Day in and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Suzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.
IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post, Oct. 25, 1983.
NCR 4430-5000 MSR/PIN User's Guide, 1994, 265 pages.
Nieman Marcus: High-Tech for the Holidays, ADWEEK, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.
Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes Up Peripherals Market, Chain Store Age, Jun. 1996, 3 pages.
O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.
David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
Co-pending U.S. Appl. No. 12/626,349, filed Nov. 25, 2009, titled Machine, Methods, and Program Product for Electronic Inventory Tracking.
Co-Pending U.S. Appl. No. 12/609,896, filed Oct. 30, 2009, titled Machine Methods, and Program Product for Electronic Order Entry.
International Search Report for PCT/US09/56072 dated Oct. 20, 2009.
Bank Deals-Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org, Jan. 2009.
Avoid Gift Card Pitfalls, ConsumerReports.org, Dec. 2007.
VIPGift Receives Investment From Summit Partners and Bridgescale Partners, Nov. 11, 2008, Chattanooga, TN and Palo Alto, CA.
Downes, How to avoid exchange charges Wasting Money A foreign currency bank account could be the answer, The Daily Telegraph, London (UK), Mar. 10, 2007.
Office Action for co-pending U.S. Appl. No. 13/232,405 dated Feb. 2, 2012.
Final Office Action for co-pending U.S. Appl. No. 12/465,277 dated Feb. 28, 2012.
Notice of Allowance for co-pending U.S. Appl. No. 12/417,182 dated Feb. 14, 2012.
Final Office Action for co-pending U.S. Appl. No. 12/338,497 dated Mar. 1, 2012.
Office Action for co-pending U.S. Appl. No. 12/877,524, dated Feb. 14, 2012.
Check Cashers Move Into Cards, Accounts (Cover Story), ATM & Debit News [serial online], Apr. 20, 2006, 6(24), pp. 1-3, available from Business Source Complete, Ipswich, MA.
Mangu-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.

Final Office Action for co-pending U.S. Appl. No. 13/232,405 dated May 22, 2012.
Office Action for co-pending U.S. Appl. No. 13/405,051 dated Jun. 6, 2012.
Final Office Action for co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Office Action for co-pending U.S. Appl. No. 13/282,186 dated Jul. 13, 2012.
Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Final Office Action for co-pending U.S. Appl. No. 12/626,349 dated Jul. 20, 2012.
Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance for co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Notice of Allowance for co-pending U.S. Appl. No. 12/877,490 dated Sep. 20, 2012.

* cited by examiner

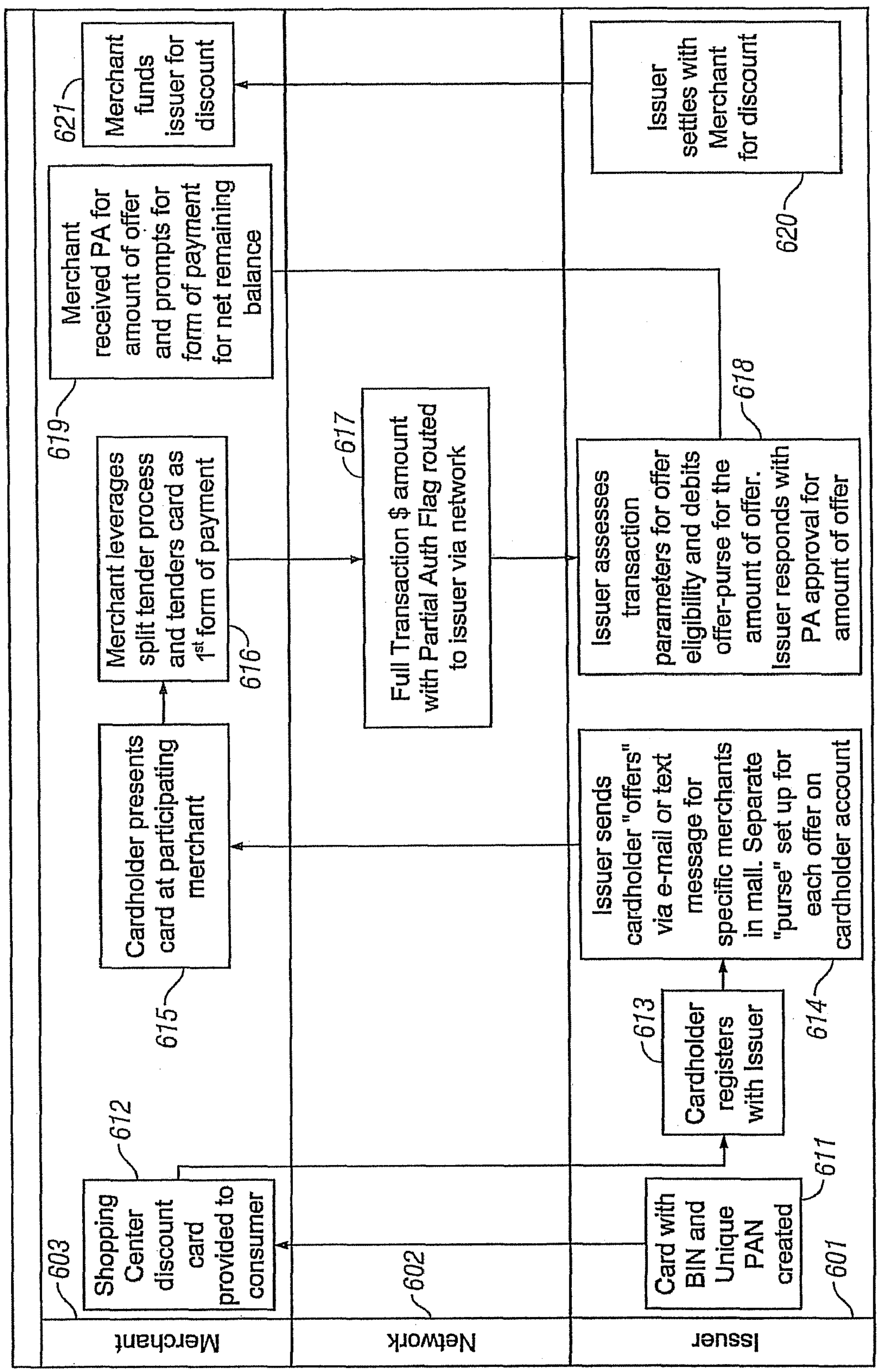
FIG. 6
Merchant
Network
Issuer
603
602
601
Card with BIN and Unique PAN created
611
Shopping Center discount card provided to consumer
612
Cardholder registers with Issuer
613
Issuer sends cardholder "offers" via e-mail or text message for specific merchants in mall. Separate "purse" set up for each offer on cardholder account
614
Cardholder presents card at participating merchant
615
Merchant leverages split tender process and tenders card as 1st form of payment
616
Full Transaction $ amount with Partial Auth Flag routed to issuer via network
617
Issuer assesses transaction parameters for offer eligibility and debits offer-purse for the amount of offer. Issuer respond with PA approval for amount of offer
618
Merchant received PA for amount of offer and prompts for form of payment for net remaining balance
619
Issuer settles with Merchant for discount
620
Merchant funds issuer for discount
621

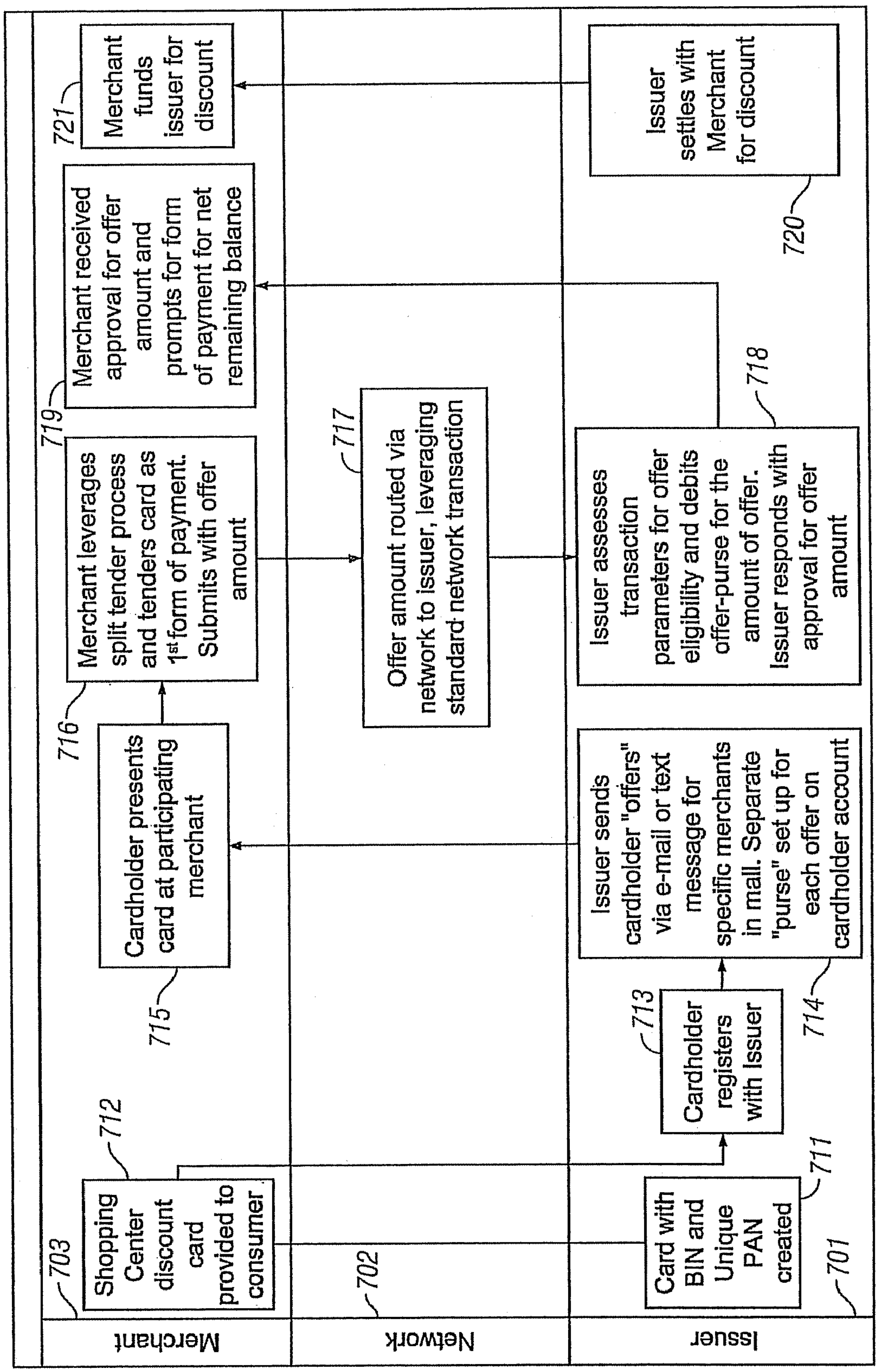
FIG. 7
Merchant
Network
Issuer
703
702
701
Shopping Center discount card provided to consumer
712
Card with BIN and Unique PAN created
711
Cardholder registers with Issuer
713
Issuer sends cardholder "offers" via e-mail or text message for specific merchants in mall. Separate "purse" set up for each offer on cardholder account
714
Cardholder presents card at participating merchant
715
Merchant leverages split tender process and tenders card as 1st form of payment. Submits with offer amount
716
Offer amount routed via network to issuer, leveraging standard network transaction
717
Issuer assesses transaction parameters for offer eligibility and debits offer-purse for the amount of offer. Issuer responds with approval for offer amount
718
Merchant received approval for offer amount and prompts for form of payment for net remaining balance
719
Issuer settles with Merchant for discount
720
Merchant funds issuer for discount
721

900

CARD XXXX XXXX XXXX XXXX — 901

902 — Purchase Purse $XX
903 — Offer Purse No. 1 $XX

903 — Offer Purse No. N $XX

904 — Cardholder Name: XXXX XXXX
905 — E-mail address: XXXXXX
906 — text message address: XXXXXXX
907 — birthday: XX XX XXXX
908 — mailing address: XXXXXXXXXXX

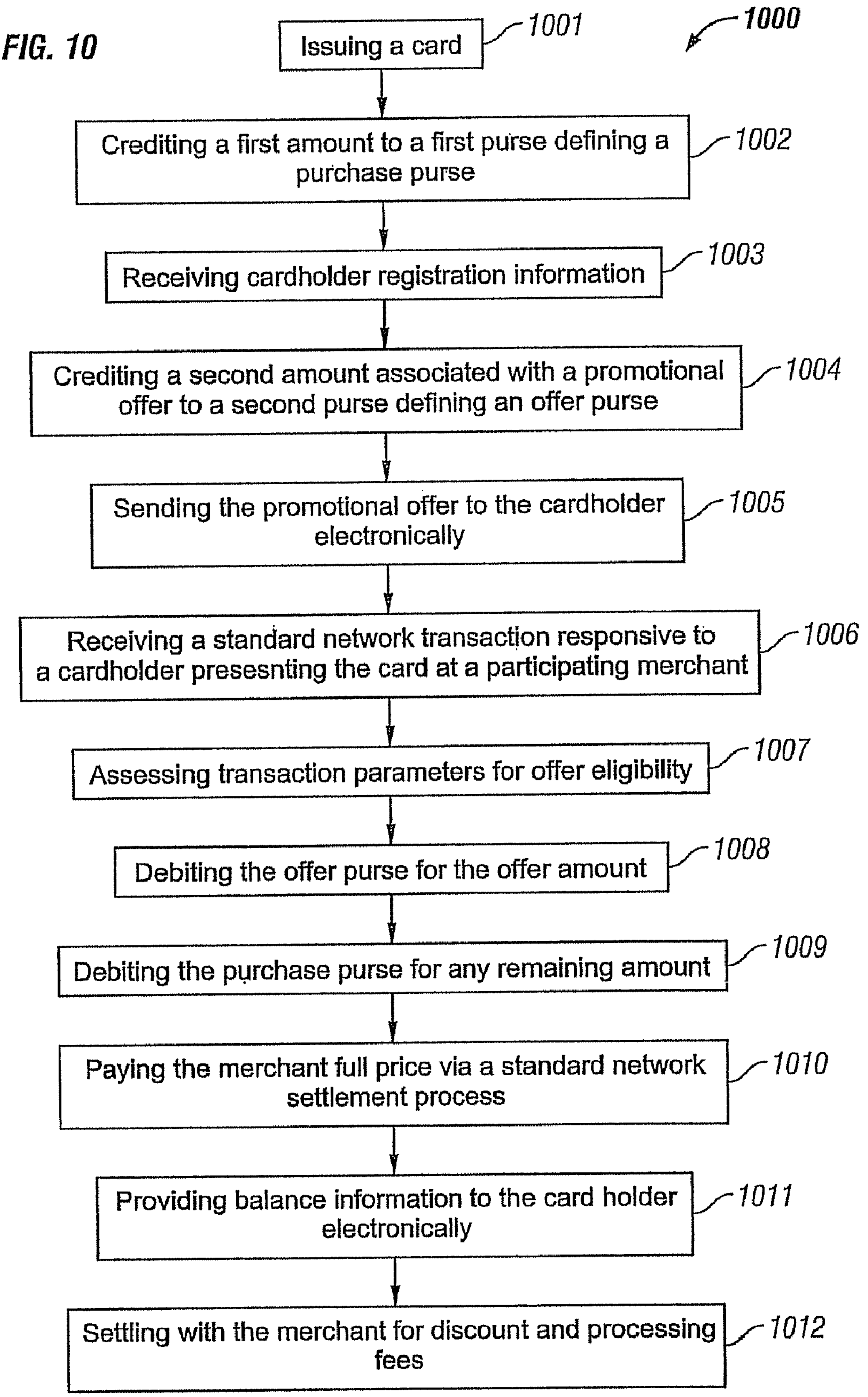
FIG. 10
1000
Issuing a card
1001
Crediting a first amount to a first purse defining a purchase purse
1002
Receiving cardholder registration information
1003
Crediting a second amount associated with a promotional offer to a second purse defining an offer purse
1004
Sending the promotional offer to the cardholder electronically
1005
Receiving a standard network transaction responsive to a cardholder presesnting the card at a participating merchant
1006
Assessing transaction parameters for offer eligibility
1007
Debiting the offer purse for the offer amount
1008
Debiting the purchase purse for any remaining amount
1009
Paying the merchant full price via a standard network settlement process
1010
Providing balance information to the card holder electronically
1011
Settling with the merchant for discount and processing fees
1012

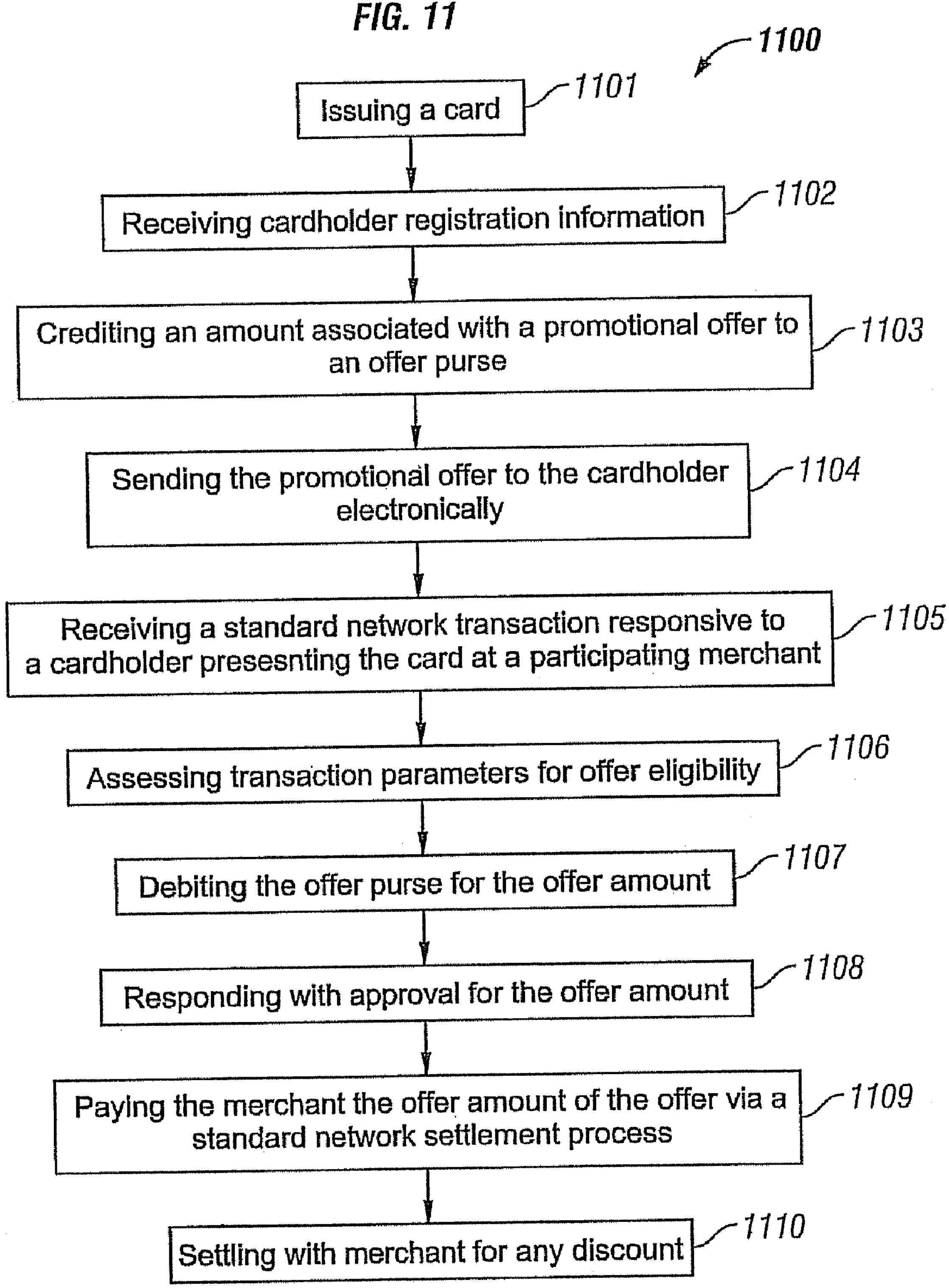
FIG. 11
1100
Issuing a card
1101
Receiving cardholder registration information
1102
Crediting an amount associated with a promotional offer to an offer purse
1103
Sending the promotional offer to the cardholder electronically
1104
Receiving a standard network transaction responsive to a cardholder presesnting the card at a participating merchant
1105
Assessing transaction parameters for offer eligibility
1106
Debiting the offer purse for the offer amount
1107
Responding with approval for the offer amount
1108
Paying the merchant the offer amount of the offer via a standard network settlement process
1109
Settling with merchant for any discount
1110

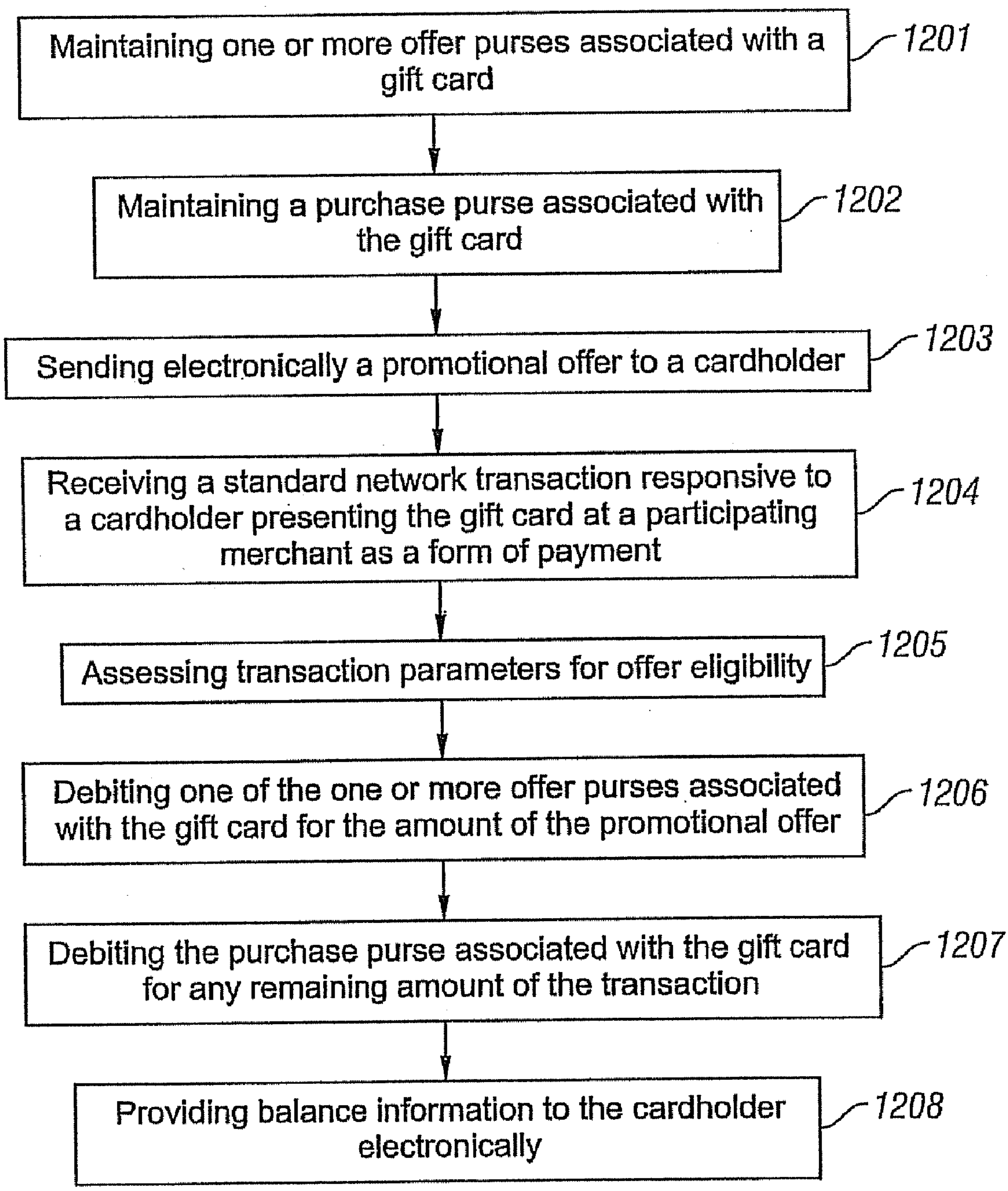
FIG. 12
1200
Maintaining one or more offer purses associated with a gift card
1201
Maintaining a purchase purse associated with the gift card
1202
Sending electronically a promotional offer to a cardholder
1203
Receiving a standard network transaction responsive to a cardholder presenting the gift card at a participating merchant as a form of payment
1204
Assessing transaction parameters for offer eligibility
1205
Debiting one of the one or more offer purses associated with the gift card for the amount of the promotional offer
1206
Debiting the purchase purse associated with the gift card for any remaining amount of the transaction
1207
Providing balance information to the cardholder electronically
1208

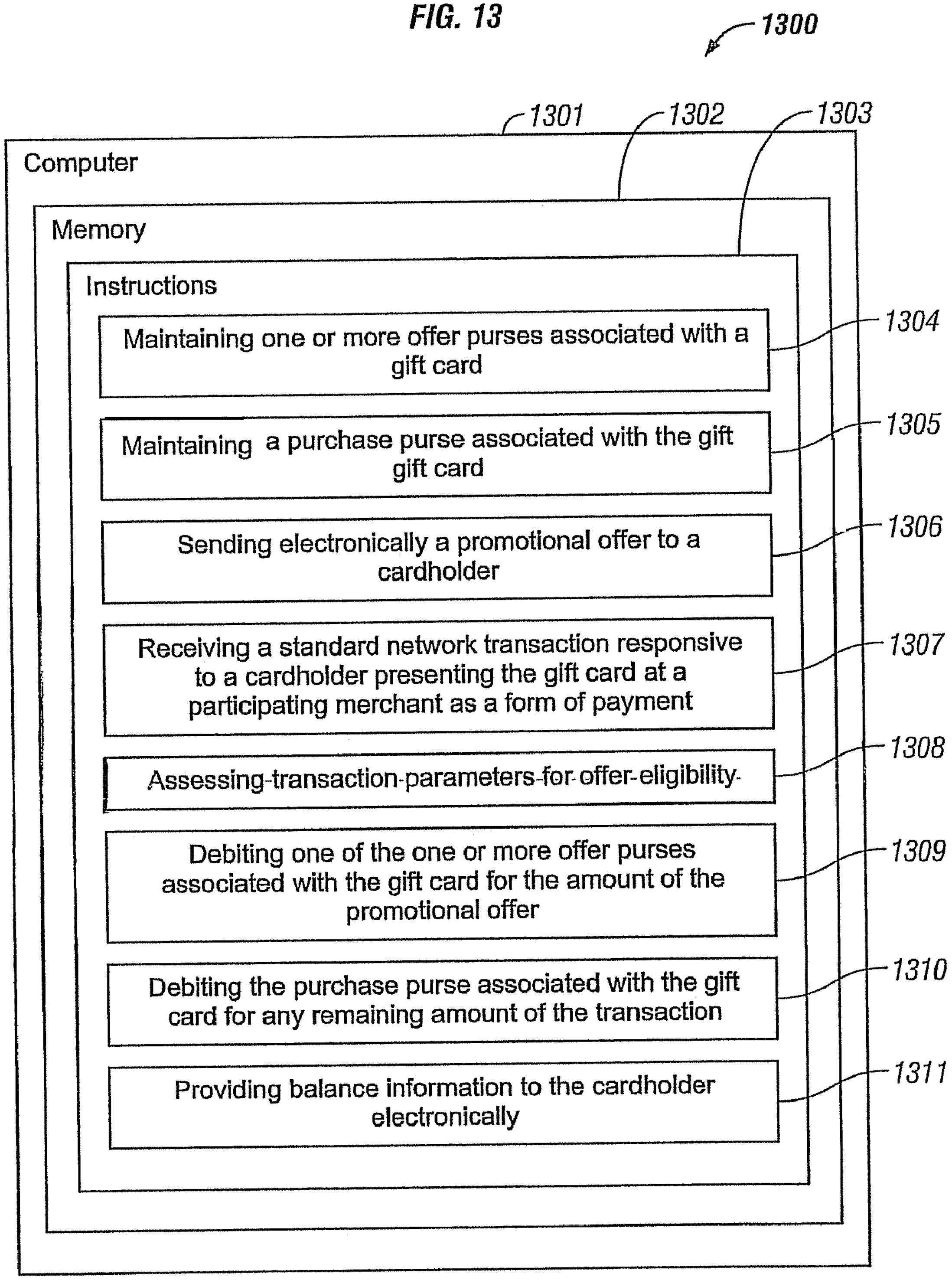
FIG. 13
1300
1301
1302
1303
Computer
Memory
Instructions
Maintaining one or more offer purses associated with a gift card
1304
Maintaining a purchase purse associated with the gift gift card
1305
Sending electronically a promotional offer to a cardholder
1306
Receiving a standard network transaction responsive to a cardholder presenting the gift card at a participating merchant as a form of payment
1307
Assessing transaction parameters for offer eligibility
1308
Debiting one of the one or more offer purses associated with the gift card for the amount of the promotional offer
1309
Debiting the purchase purse associated with the gift card for any remaining amount of the transaction
1310
Providing balance information to the cardholder electronically
1311

SHOPPING CENTER GIFT CARD OFFER FULFILLMENT MACHINE, PROGRAM PRODUCT, AND ASSOCIATED METHODS

RELATED APPLICATIONS

This application claims priority to and the benefit of: U.S. Provisional Patent Application Ser. No. 61/109,022, by Galit et al., titled "Shopping Center Gift Card Offer Fulfillment System, Program Product, and Associated Methods" filed Oct. 28, 2008, which is incorporated herein by reference in its entirety.

BACKGROUND

1. Field of Invention

The present invention relates generally to the financial service and gift card product industries, and, more particularly, to machines, computer program products, and associated computer-implemented methods of providing promotions and limited offers utilizing a gift card.

2. Background

Gift cards are popular prepayment mechanisms today. In a common scenario, a giver purchases a gift card from a merchant. The giver exchanges funds via cash, check, credit card, or other transaction for a gift card having a value. The giver then gives the gift card to a recipient. The recipient, now a cardholder, can then redeem the value on the gift card at the merchant for goods or services. In this scenario, the gift card acts as a gift certificate.

Because of the convenience and flexibility of gift cards, merchants also use gift cards to provide consumers with rebates, discounts, in-store credit, and other promotions. For example, a merchant may offer a gift card having a value of $5 with any transaction of at least $50. In another example, for test-driving a new automobile, an automobile dealer can provide a consumer a gift card redeemable for a $3 discount at an unaffiliated movie theater. In these scenarios, the gift cards act as promotional items.

In addition to merchants, gift cards can be offered by a parent corporation for redemption at various affiliated merchants, by a bank for redemption at a variety of merchants, or by a shopping center, or mall, for redemption at merchants at the shopping center.

Coupons are printed advertisements redeemed by consumers to obtain a discount on merchandise or services. Coupon books are collections of coupons, which can include a common theme or association. For example, a shopping center can bundle coupons or offers from various merchants in the shopping center into a coupon book to promote the shopping center as a destination and cross-promote the participating merchants. Coupons, however, can require extensive paper handling and result in significant fulfillment costs. Moreover, the distribution of coupons is expensive and can be inflexible. Coupons may be distributed electronically to consumers, e.g., through e-mail or the Internet, but the consumer is generally required to print the coupon in order to redeem an electronic coupon.

In addition, coupons and other promotions, deductions, or discounts can require changes at the POS terminal, including procedures and software, can impose expenses on merchants for technology and training, and can result in inefficiency and uncertainty.

SUMMARY OF INVENTION

Applicants' invention relates to providing dynamic offers and promotions to specific consumers with fulfillment services handled by the issuer on the back end, without requiring changes at the POS terminal. Dynamic offers can include an offer having a predetermined duration, e.g., a few hours, and an offer responsive to behavior as described herein. Accordingly, Applicants provide a shopping center gift card offer fulfillment machine, program product, and associated methods.

Embodiments of the present invention provide for a gift card, e.g., a shopping center gift card redeemable at various merchants of a shopping center, having a bank identification number and a unique cardholder account number. Like many other gift cards, a consumer can purchase the gift card for personal use or can otherwise obtain the gift card as a gift or as part of promotion as understood by those skilled in the art. Once a cardholder obtains the gift card, the cardholder can register with the gift card issuer to receive dynamic offers, discounts, and other promotions according to exemplary embodiments. That is, the cardholder provides the issuer of the gift card with registration data, including contact information, such as, a phone number for text messages, an email address, or other address as understood by those skilled in the art. The cardholder can also provide demographic information, including age, education level, income level, marital and family status, and other registration data as understood by those skilled in the art. The card issuer can then provide offers, discounts, and other promotions, typically on behalf of a merchant, to the cardholder according to the addresses and preferences as registered by the cardholder. To take advantage of an offer, the cardholder simply presents the gift card as a form of payment to the merchant referenced in the offer. No coupons are necessary. No change to the merchant's POS terminal is necessary. And no general or untargeted mass discounting results because to redeem an offer requires the presenting of the gift card. That is, each offer can be limited to specific cardholders, or even an individual cardholder.

According to exemplary embodiments, the gift card issuer can fulfill the transaction by utilizing multiple offer purses, or distinct sub-accounts, associated with the unique cardholder account number of the gift card. For example, a first purse defining a purchase purse involves the traditional amount of value, i.e., money, associated with gift card. The purchase purse reflects the "face value" of the gift card. Exemplary embodiments can include allowing the cardholder to load value on the purchase purse or to load additional value, e.g., to reload or recharge the card. A second purse defining an offer purse involves the amount of value associated with an offer, discount, or promotion. Exemplary embodiments include multiple offer purses, each purse associated with an offer, discount, or promotion.

In an exemplary embodiment, a cardholder purchases a shopping center gift card for $50, and $50 is credited to the purchase purse associated with the card. In this example, there is no fee for loading the amount onto the gift card and no discount for purchasing the gift card, although other exemplary embodiments provide for such fees, discounts, or both as understood by those skilled in the art. The cardholder registers with the gift card issuer to receive offers, discounts, and promotions. The issuer, on behalf of the shopping center management company, then provides $3 to an offer purse associated with the gift card and sends a text message to the cardholder with a promotion for $3 off any purchase at the food court at the shopping center made in the next 48 hours. The cardholder receives the promotion information via the text message and the next day visits the food court at the shopping center to take advantage of the promotion. The cardholder places an order for $4.95 and presents the gift card as payment. The merchant enters the transaction information using the gift card as payment and a value of $4.95. As part of the transaction approval process, the issuer assesses the transaction parameters for offer eligibility. The issuer debits the offer purse for $3 and debits the purchase purse for remaining $1.95. Afterwards the purchase purse amount is $48.05 (or $50-$1.95=$48.05). If the merchant supports a balance inquiry feature, the merchant can supply the cardholder with the balance on the gift card, e.g., the balance corresponding to the balance in the purchase purse. In addition, the issuer can push, or send, the purchase purse balance on the gift card to the cardholder electronically, such as, via a text message, or through other mechanisms as understood by those skilled in the art. The issuer can pay the merchant full price via a standard network settlement process; the issuer can also generate reports for the shopping center management company sponsoring the offer.

Exemplary embodiments provide tremendous flexibility for offers, discounts, and promotions. Exemplary embodiments include providing a promotion to an individual cardholder or to a collection of individual cardholders according to the desires and goals of the sponsor or issuer. Exemplary embodiments allow the issuer or sponsor to target a promotion with great specificity and to analyze the effectiveness of the promotion. For example, a promotion could be sent to unmarried males, aged 25 through 28, with a balance on the gift card greater than $50. Exemplary embodiments can further include time-and-date-dependent promotions, such as, a discount for purchases made Monday through Thursday between 10 A.M. and 2 P.M., or a discount for purchases made on Tuesdays in January. Moreover, exemplary embodiments allow the issuer to provide promotions in response to a cardholder's actions, or transactions. For example, after several purchases using the gift card over a few hours, the issuer can offer the cardholder a discount on food and drink, such as, at an ice cream parlor or coffee shop within the shopping center.

Exemplary embodiments include the use of an open payment network, e.g., VISA, MASTERCARD, DISCOVER CARD, and AMERICAN EXPRESS payment networks, for purchase authorization and payments, rather than a proprietary or in-house system. Also, the gift card can be a network-branded card as understood by those skilled in the art. Exemplary embodiments do not require changes to the POS terminal or paper handling traditionally associated with coupons, including coupons that require the consumer to print an e-mail or website.

Exemplary embodiments also include the use of the gift card to redeem offers, rebates, discounts, or promotions in conjunction with another form of payment. If the gift card is without a purchase purse, the merchant can employ a split tender process and tender the gift card as the first form of payment. In a partial authorization scenario, the full transaction amount with the partial authorization flag is routed to the issuer. The issuer then accesses the transaction parameters for offer eligibility, debits the offer purse for the amount of the offer, and responds with partial authorization approval for the amount of the offer. Alternately, in a standard authorization scenario, the offer amount is routed to the issuer, leveraging a standard network transaction. The issuer then accesses the transaction parameters for offer eligibility, debits the offer purse for the amount of the offer, and responds with approval for the amount of the offer. In either scenario, the merchant receives approval for the offer amount and prompts for another form of payment for the net remaining balance, such as, a credit card, a check, cash, or another gift card.

In an exemplary embodiment, a cardholder obtains a shopping center gift card. In this example, there is no "face value" to the gift card and no purchase purse associated with the card. The cardholder registers with the gift card issuer to receive offers, discounts, and promotions. The issuer, on behalf of a merchant, then provides $10 to an offer purse associated with the gift card and sends a text message to the cardholder with a promotion for 10% off any purchase, up to $100, at specific clothing merchant at the shopping center made in the next 15 days. The cardholder receives the promotion information via the text message and within the time of the promotion visits the clothing merchant at the shopping center to take advantage of the promotion. The cardholder selects $80 of merchandise and presents the gift card and a credit card as payment. The merchant employs a split tender process and tenders the gift card as the first form of payment. The full transaction amount with the partial authorization flag is routed to the issuer. The issuer then accesses the transaction parameters for offer eligibility, debits the offer purse for the amount of the offer (in this case, $8 or 10% of $80), and responds with partial authorization approval for the amount of the offer (in this case $8). The merchant receives approval for the offer amount and employs the credit card as payment for the net remaining balance of $72. Then the merchant and issuer settle.

Exemplary embodiments provide for a computer program product, stored on a tangible computer readable memory media, operable on a computer, the computer program product comprising a set of instructions that, when executed by the computer, cause the computer to perform various operations. The operations can include maintaining one or more offer purses associated with a gift card having a bank identification number and a unique cardholder account number. The operations can also include maintaining a purchase purse associated with the gift card. The operations can include sending electronically a promotional offer to a cardholder of the gift card responsive to the cardholder registration information. The operations can include receiving a standard network transaction responsive to a cardholder presenting the gift card at a participating merchant as a form of payment. The operations can include assessing transaction parameters for offer eligibility, debiting one of the one or more offer purses associated with the gift card for the amount of the promotional offer, and debiting the purchase purse associated with the gift card for any remaining amount of the transaction.

Embodiments can include, for example, an offer fulfillment computer to perform a process of activating an offer purse associated with a gift card and satisfying at least in part from the offer purse a standard transaction approval request utilizing the gift card as a form of payment. The offer fulfillment computer can include, for example, a processor positioned to activate an offer purse associated with a gift card. The offer fulfillment computer can include, for example, an input-output interface to notify a cardholder of a promotional offer available through the gift card and to receive a standard transaction approval request responsive to the cardholder presenting the gift card at a participating merchant as a form of payment. The offer fulfillment computer can include, for example, a memory having stored therein a computer program product. The computer program product can be stored on a tangible computer memory media, operable on the processor, and include a set of instructions that, when executed by the processor, cause the offer fulfillment computer to satisfy at least in part from the offer purse a standard transaction approval request utilizing the gift card as a form of payment by performing various operations. The operations can include, for example, activating, by the processor, an offer purse associated with a gift card having a bank identification number and a unique cardholder account number. The offer purse can be a sub-account associated with a promotional offer. The operations can include, for example, notifying, by the processor through the input-output interface, a cardholder of the promotional offer available through the gift card. The operations can include, for example, matching, in memory, the offer purse to a standard transaction approval request responsive to the cardholder presenting the gift card at a participating merchant as a form of payment. The operations can include, for example, determining, by the processor, eligibility for the promotional offer responsive to transaction parameters from the standard transaction approval request. The operations can include, for example, updating, in memory, an amount associated with the offer purse responsive to the promotional offer to thereby satisfy at least in part from the offer purse the standard transaction approval request.

Embodiments can include, for example, a computer-implemented method of fulfilling a promotional offer utilizing a gift card and an offer fulfillment computer. The computer-implemented method can include, for example, activating, by a processor, an offer purse associated with a gift card having a bank identification number and a unique cardholder account number. The computer-implemented method can include, for example, notifying, by the processor through an input-output interface, a cardholder of the promotional offer available through the gift card. The computer-implemented method can include, for example, matching, in memory, the offer purse to a standard transaction approval request responsive to the cardholder presenting the gift card at a participating merchant as a form of payment. The computer-implemented method can include, for example, determining, by the processor, eligibility for the promotional offer responsive to transaction parameters from the standard transaction approval request. The computer-implemented method can include, for example, updating, in memory, an amount associated with the offer purse responsive to the promotional offer to thereby satisfy at least in part from the offer purse the standard transaction approval request.

In addition, embodiments of the present invention include other systems, computers, program products, and associated methods of providing promotions and offers via a gift card as will be understood by those skilled in the art.

BRIEF DESCRIPTION OF DRAWINGS

So that the manner in which the features and benefits of the invention, as well as others that will become apparent, may be understood in more detail, a more particular description of the invention briefly summarized above may be had by reference to the embodiments thereof, which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 6 is a schematic block diagram of a fulfillment system utilizing a gift card as part a split tender process with partial authorization according to an exemplary embodiment;

FIG. 7 is a schematic block diagram of a fulfillment system utilizing a gift card as part a split tender process with standard authorization according to another exemplary embodiment;

FIG. 10 is a schematic flow diagram of a method of fulfilling a promotional offer utilizing a gift card according to an exemplary embodiment;

FIG. 11 is a schematic flow diagram of a method of fulfilling a promotional offer utilizing a gift card according to another exemplary embodiment;

FIG. 12 is a schematic flow diagram of a method of fulfilling a promotional offer utilizing a gift card according to yet another exemplary embodiment;

FIG. 13 is a schematic block diagram of computer program product according to an exemplary embodiment;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art.

Applicants' exemplary embodiments of the invention provide dynamic offers and promotions to consumers with fulfillment services handled by the issuer on the back end, without requiring changes at the POS terminal. Accordingly, Applicants provide a shopping center gift card offer fulfillment system, program product, and associated methods.

Figure 1:
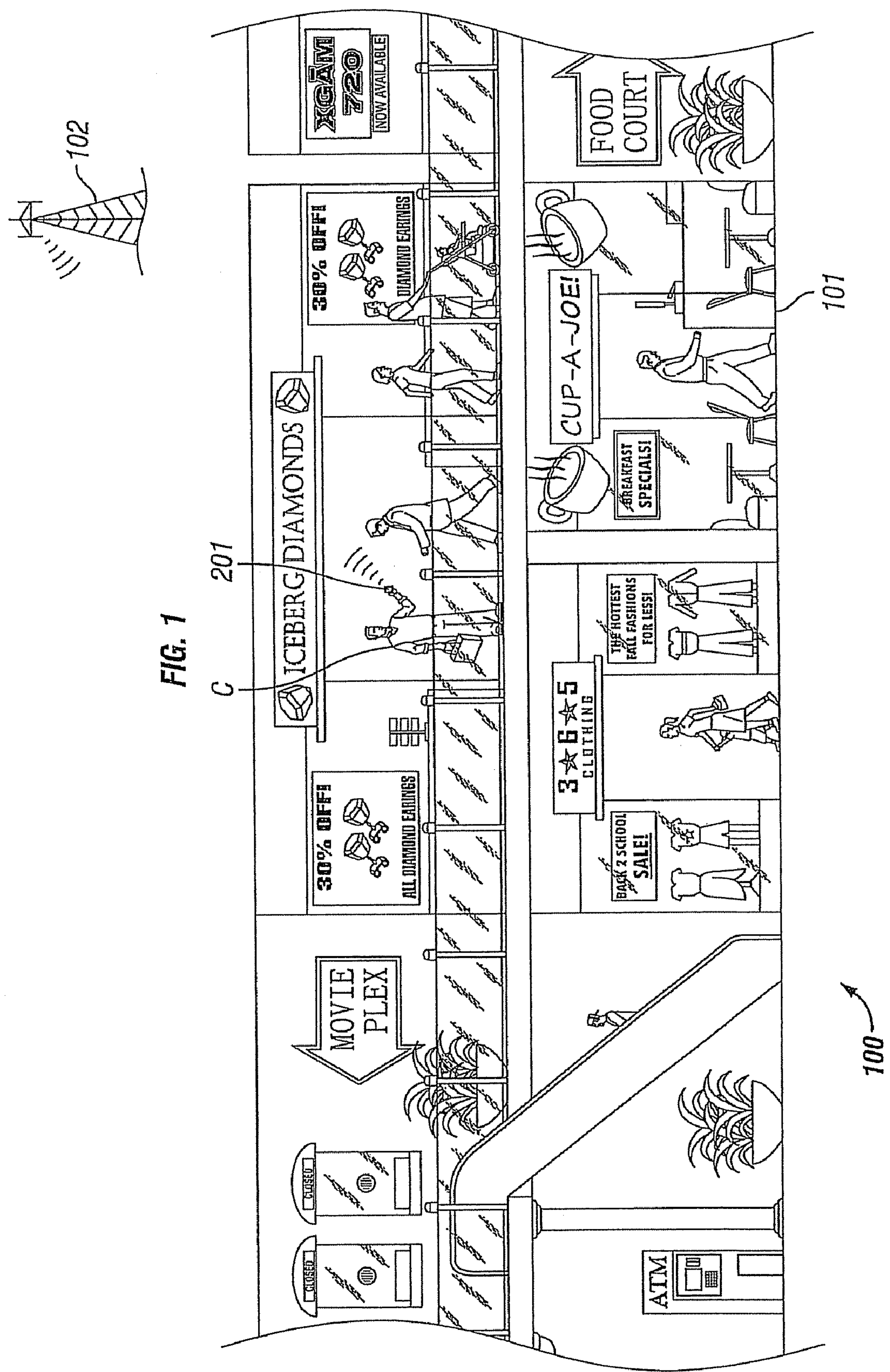
FIG. 1 is an environmental view of a cardholder receiving a promotional offer in a shopping center according to an exemplary embodiment.
Figure 2:
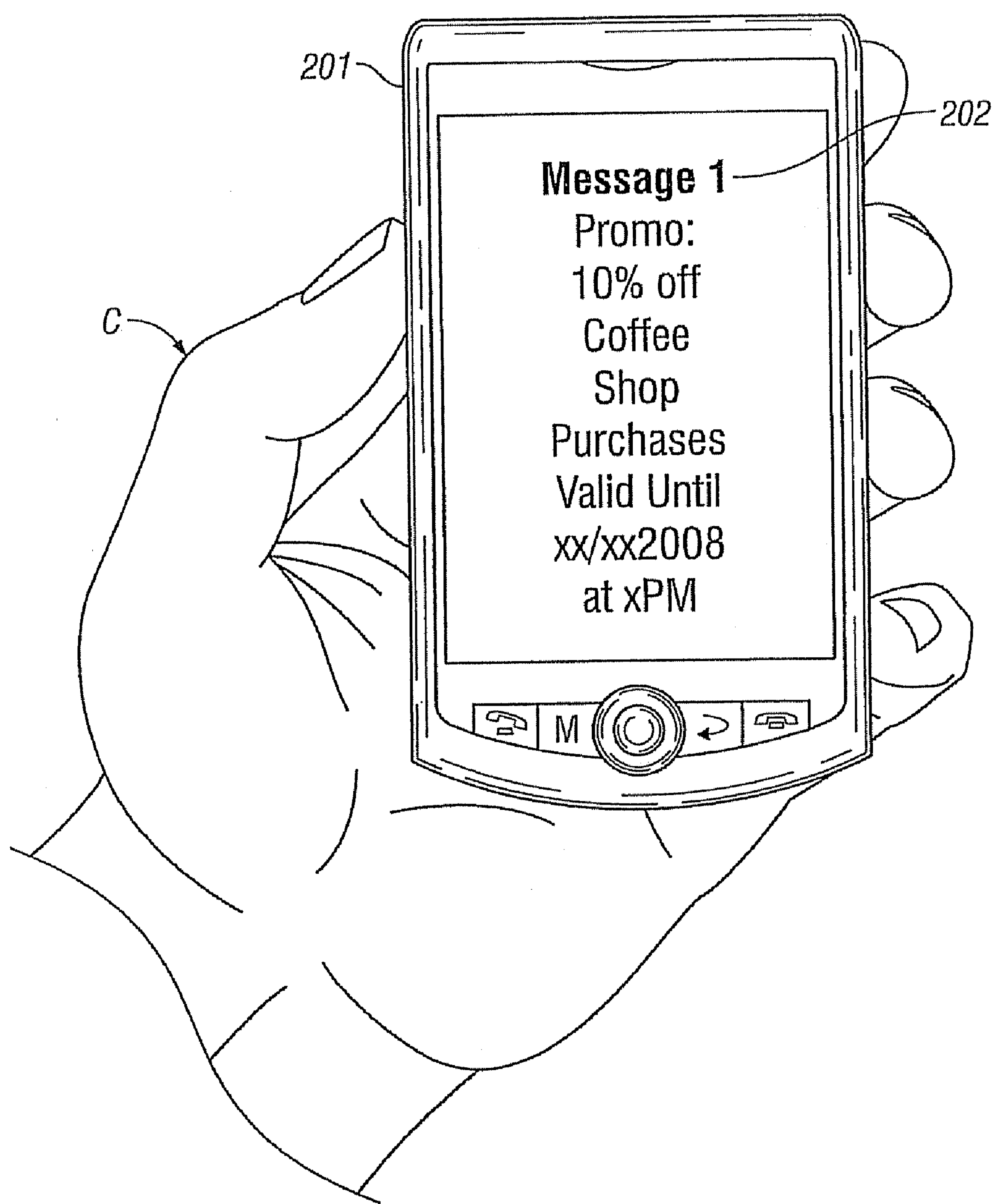
FIG. 2 is a front plan view of a cardholder's hand holding a personal digital assistant (PDA) displaying a promotional offer according to an exemplary embodiment.
Figure 3:
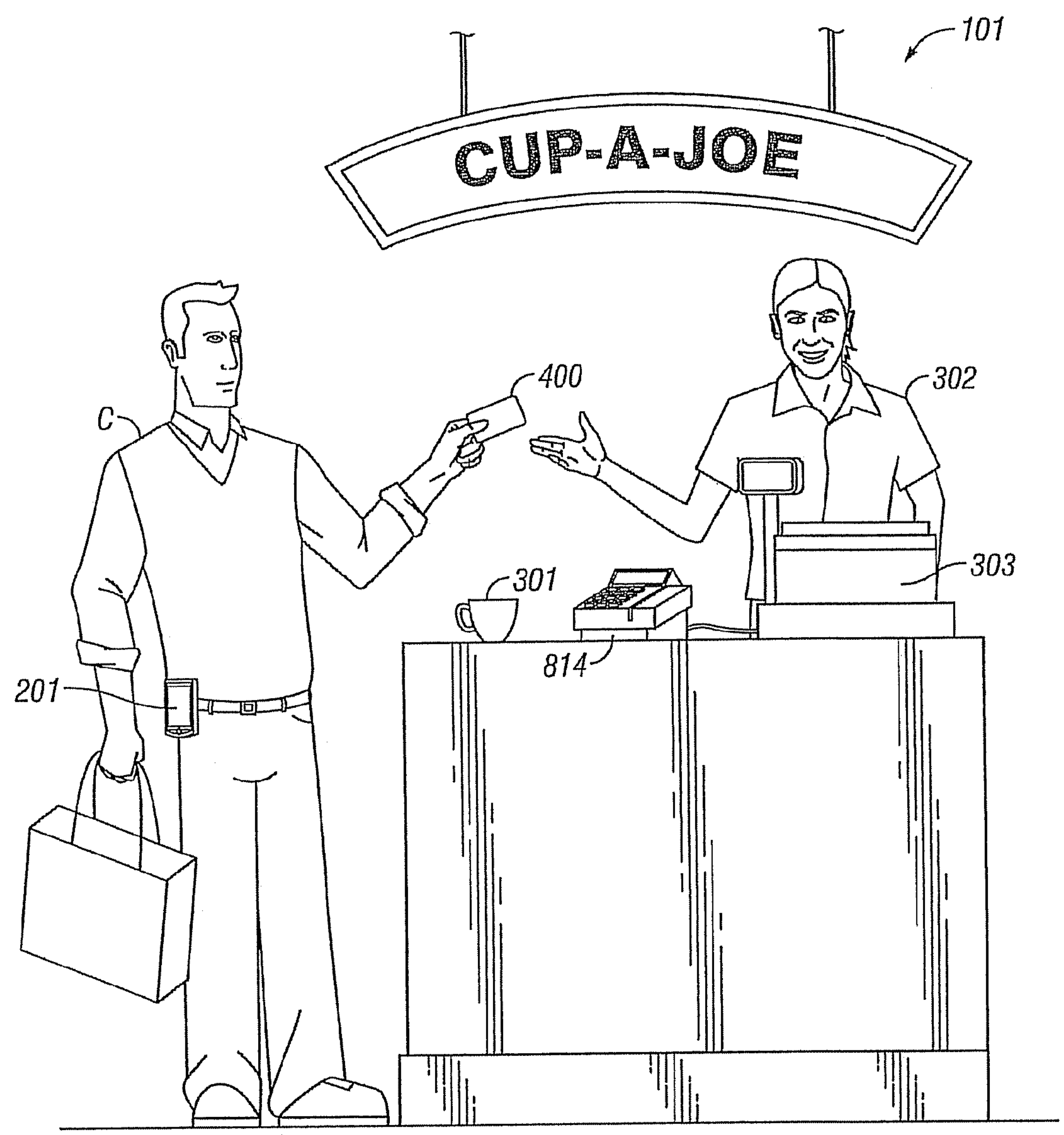
FIG. 3 is an environmental view of a cardholder utilizing a shopping center gift card to redeem a promotional offer at a merchant according to an exemplary embodiment.

As illustrated in FIGS. 1-3, exemplary embodiments include a cardholder C receiving a promotional offer 202 electronically and then redeeming the offer through the use of a gift card 400 at a merchant 101 in a shopping center 100. As illustrated in FIG. 1, exemplary embodiments include the cardholder C receiving a promotional offer on a mobile phone or personal digital assistant (PDA) 201 utilizing standard communications network infrastructure, such as, a cellular telephone tower 102. The cardholder C can be at the shopping center 100, but does not need to be. Advantageously, a promotional offer 202 can entice the cardholder to journey to the shopping center. As illustrated in FIG. 2, exemplary embodiments include a cardholder C receiving a promotional offer 202 electronically on a mobile phone or personal digital assistant 201. As illustrated in FIG. 3, exemplary embodiments including the cardholder C presenting the gift card 400 to a merchant 101 to redeem the promotional offer. Exemplary embodiments include a sales clerk 302 of the merchant 101 ringing up an item, e.g., a cup of coffee 301, at "full price" and swiping the gift card 400 at the point of sale 814 to create a standard network transaction, i.e., a standard transaction approval request. Exemplary embodiments do not require changes to the POS terminal or paper handling traditionally associated with coupons.

Figures 8, 9:
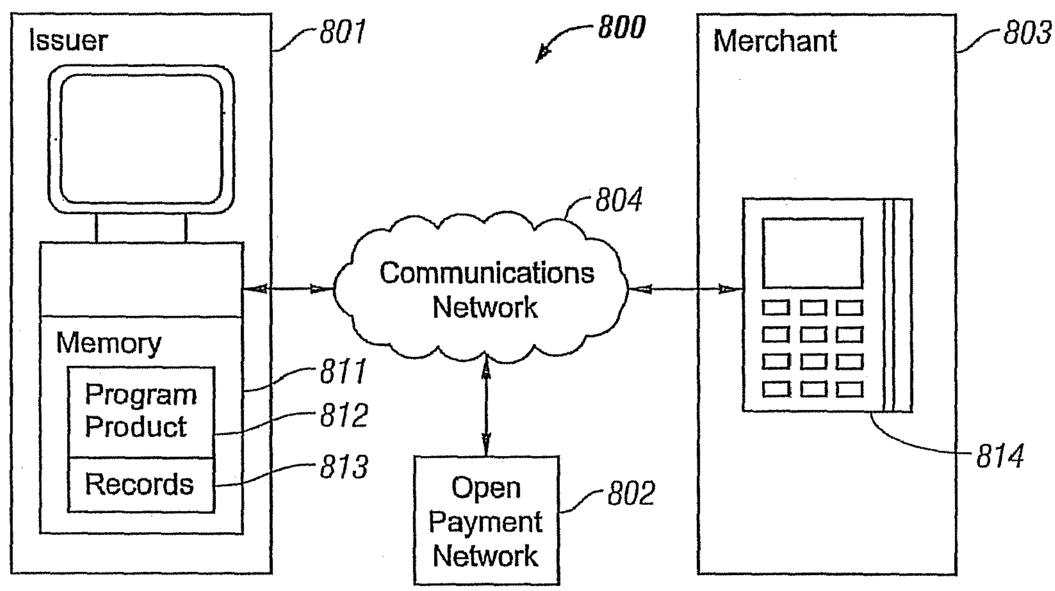
FIG. 8 is a schematic block diagram of a system according to an example embodiment.
FIG. 9 is a schematic block diagram of a computer record relating to a card and cardholder according to an exemplary embodiment.
Figure 8A:
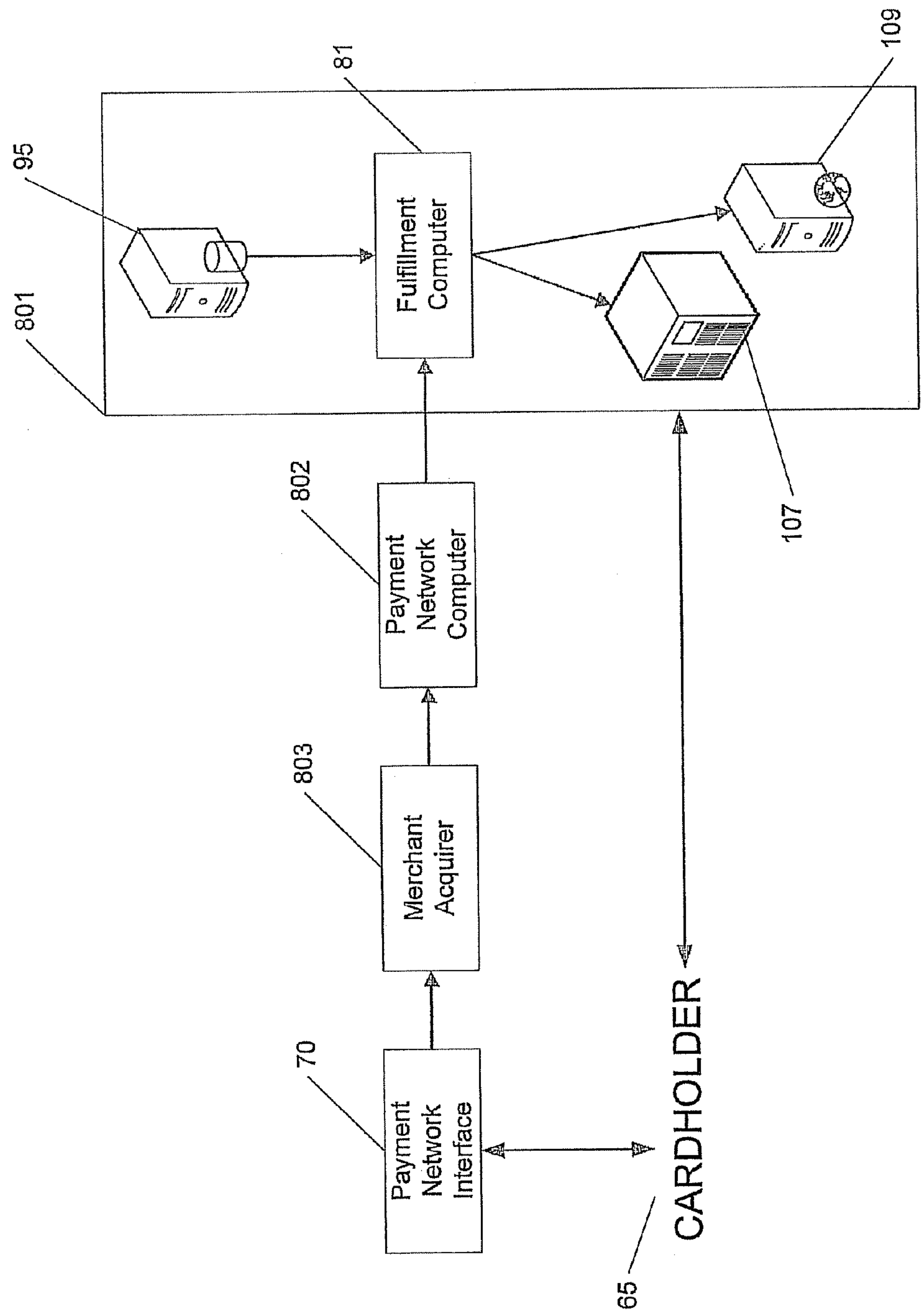
FIG. 8A is a block diagram of a payment network system used to implement exemplary embodiments of the invention.

The offer fulfillment system 800 for facilitating electronic offering of promotions related to goods, services, or goods and services (collectively and individually defining product or products), through either traditional or partial authentication messaging over an existing (traditional) financial services electronic open payment network 802, as known to those skilled in the art, is provided in FIGS. 8 and 8A. As can be seen, the system 800 includes an electronic payment network interface 70 for receiving gift card information; the merchant acquirer computer 803 for accepting the gift card information and facilitating communication of the gift card information; the open payment network 802, e.g., VISA, MASTERCARD, DISCOVER CARD, and AMERICAN EXPRESS payment networks, provided to route the transaction to the proper issuer; the issuer 801 for processing the transaction; and a fulfillment machine defining a fulfillment computer 81 for executing the instructions for facilitating crediting the gift card a discounted amount corresponding to a discount offer, all of which are connected through a communications network 804. As one skilled in the art will appreciate, the merchant acquirer, payment network, and issuer are components of a traditional payment transaction system that enables credit transactions with a merchant.

An exemplary communication network 804 connects a cardholder 65, e.g., an individual or a business, to the merchant acquirer computer 803, open payment network 802, issuer 801, and fulfillment computer 81. Communications network 804 can include, for example, a telecommunication network, which can include a wire-based telephone network, pager network, cellular network, or a combination thereof, and a computer network. As one skilled in the art will appreciate, the computer network can connect all of the system components using a local area network ("LAN") or wide area network ("WAN"), or a combination thereof. For example, the open payment network 802, issuer 801, and fulfillment computer 81 may be associated with the same entity or secured system and are thereby configured as a plurality of servers operating together in a LAN, and connect to the merchant acquirer computer 803 and customer 65 using the WAN. Alternatively, the merchant acquirer and payment network may be the same entity, or secured system, and operate together using a LAN, but use a WAN to connect to the issuer 801 and cardholder 65. Accordingly, all various configurations of the communications network, though not expressly depicted, are within the scope of the disclosure.

The payment network interface 70 is connected to the communications network 804, and allows the cardholder 65 to initiate transactions by accessing the system 800 using same. The payment network interface 70 includes, for example, a point of sale device ("POS terminal") 814 and a device interface (not shown) such as a land based or cellular telephone or computer internet connection, which are used in conjunction with gift card 400. For example, the cardholder may initiate a purchase by "swiping" the gift card 400 through a card-swiping device on the POS terminal 814, or manually enter a gift card identification number using a key pad on same. Alternatively, the cardholder may access the system 800 by connecting to the merchant via a cellular or land-based telephone, i.e., such as with catalogue purchases, or an internet connection, i.e., such as with online purchases, and using a touchtone keypad on the land based or cellular telephone, or keyboard (on, e.g., a computer, PDA, cellular telephone, etc.) to enter the gift card identification number.

Figure 4A:
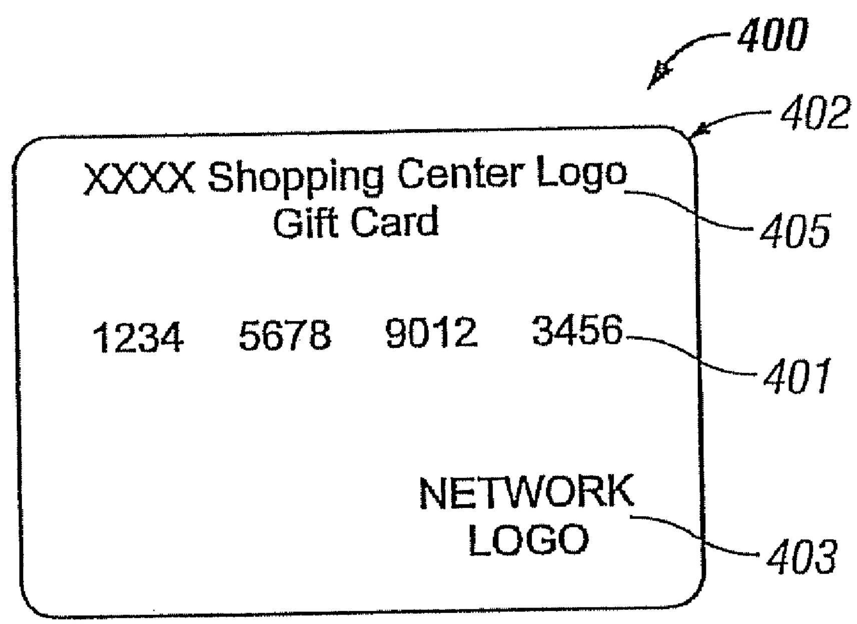
FIGS. 4A and 4B are respective front and rear elevation views of gift card according to an exemplary embodiment.
Figure 4B:
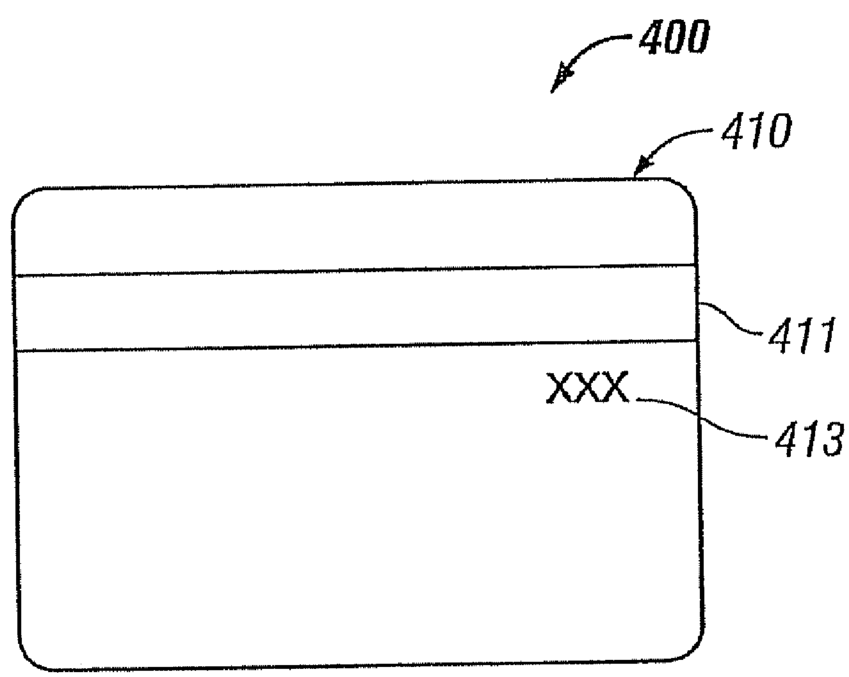

As illustrated in FIGS. 4A and 4B, exemplary embodiments include a gift card 400, e.g., a shopping center gift card redeemable at various merchants, though one skilled in the art will recognize that prepaid cards, etc., can be used in place of the gift card in the disclosed embodiments of the machine and program product and method. The gift card 400, e.g., a 3 mm card made of plastic, can include a front side 402 as illustrated in FIG. 4A and a back side 410 as illustrated in FIG. 4B. The front side 402 can display an identification number 401, including an issuer identification number ("BIN"), e.g., first six digits of identification number 401, a unique cardholder account number, e.g., nine digits of the identification number 401 following the BIN, and a check sum digit, e.g., the last digit of the identification number 401, as understood by those skilled in the art. The gift card 400 can also include a logo 405 identifying a sponsor, such as, a shopping center, and a network logo 403. The back side 410 of the gift card 400 can include a magnetic stripe 411 for storing account data and a security code 413, though other storage medium configurations for the gift card 400 e.g., a radiofrequency identification ("RFID") tag, a contact memory button, etc., can also store account data for transmission/retrieval by POS terminal 814.

In each of the embodiments of the gift card 400, the various card storage media may store a copy of the identification number 401, a cardholder name, expiration date, a network identifier, etc., in electronic or magnetic format. For example, the magnetic stripe 411 may store data on three separate tracks. Tracks one and two, which are traditionally read only tracks, could store the account number, cardholder name, card expiration date, etc., and track three, traditionally a read/write track, could allow data to be written to the magnetic stripe, e.g., identification of promotional offers, flags that the gift card has been associated with a discount offer, etc. However, as one skilled in the art will recognize, in alternative embodiments, the identification number may be the only thing stored in the various card storage media, or the gift card 400 may be a "smart card" to allow various data to be written and stored thereon, e.g., identification of promotional offers, flags that the gift card has been associated with a discount offer, etc.

Once the cardholder provides identification number 401, or the identification number 401 and other gift card data, to the payment network interface 70, the data is encrypted and transmitted through the communications network 804 to the merchant acquirer 803 where the data can be, e.g., decrypted, additional data appended thereto, and formatted for the particular payment network. At the payment network 802, the data is decrypted so that the issuer can be identified using the BIN, then routed to the appropriate issuer 801. The open payment network 802 transmits the cardholder account data, including the identification number 401, to the issuer 801 associated with BIN, which funds the transaction, i.e., bills the cardholder the charge, and can be, e.g., a bank. Here, prior to debiting a customer's account for a purchase, the issuer 801 decrypts any encryption of cardholder data, e.g., identification number 401, cardholder name, etc, and transmits same for processing by fulfillment computer 81. To achieve this end, issuer 801 can be implemented as one or more computers or computer servers each having a processor and memory coupled to the processor to store operating instructions therein.

Moreover, issuer 801 can include the fulfillment computer 81 as a separate component, module, program product, or server within an internal network of servers comprising the issuer 801. In this way, issuer 801 may be configured as a plurality of computers or servers connected via a local area network (LAN). As can be seen in FIG. 8A, in such an embodiment, the issuer 801 could be configured to include a database server 95, fulfillment computer 81, telecommunications interface 107, and web server 109.

The database server 95 can be used to store cardholder and merchant account and promotional information in separate records, tables, or columns in an associated database, which may be received from the payment network 70. As is understood in the art, the database server includes a processor directing data from a bus into the database memory, which can be, e.g., a hard drive, optical storage or the like, and computer software that provides each of the plurality of issuer component computers (not shown), including the fulfillment computer 81, access to the data therein. For example, as illustrated in FIG. 9, an exemplary database record 900 contained in the database server 95 relating to a card and cardholder, can include a card identification number 901, a purchase purse balance 902, one or more offer purse balances 903, a cardholder name 904, an e-mail address 905, a text message address 906, a cardholder birthday 907, and mailing address 908.

Figure 15:
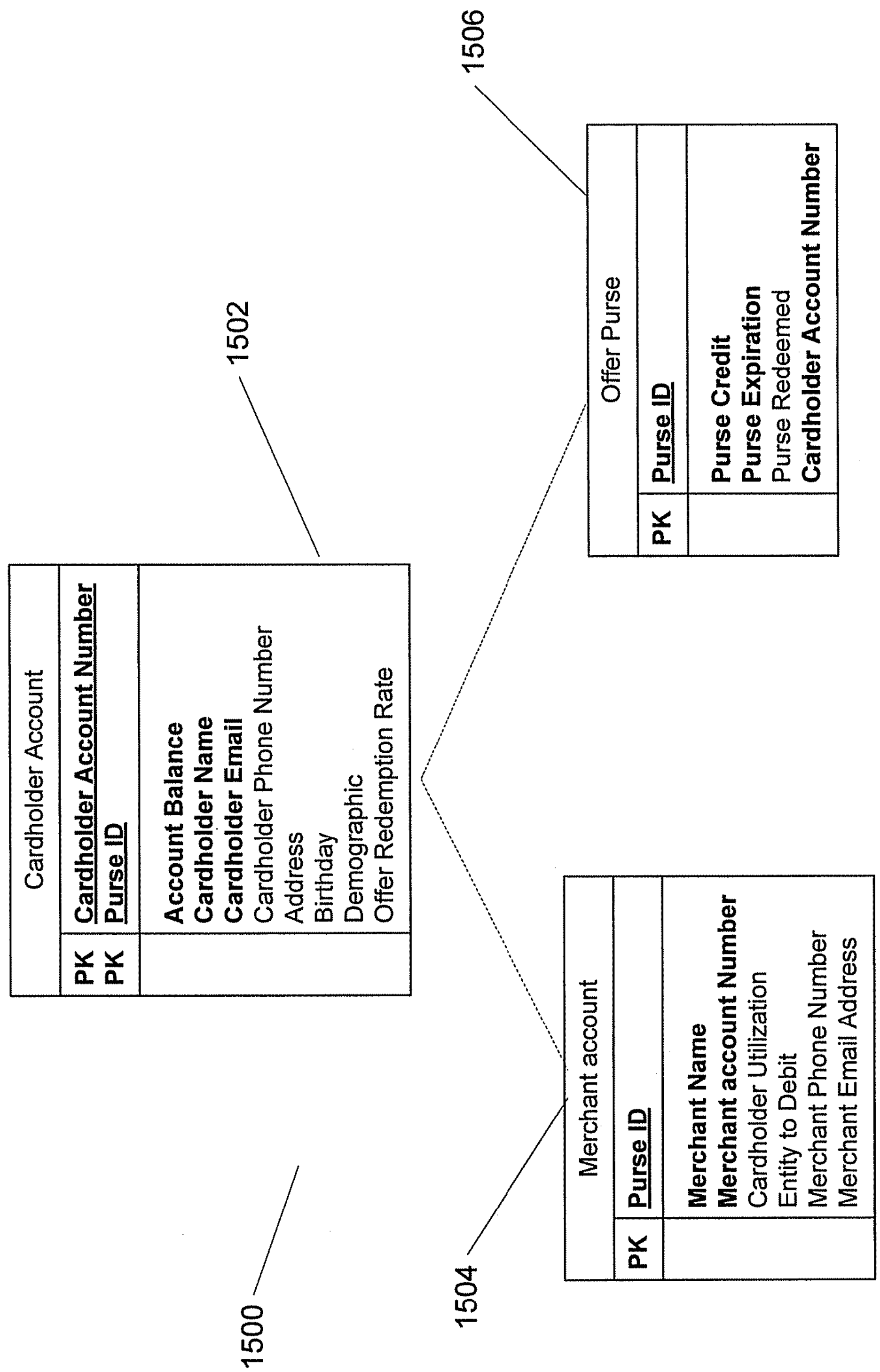
FIG. 15 is a block diagram of an exemplary database structure according to an exemplary embodiment of the invention.

FIG. 15 shows an exemplary database structure for cardholder data stored in database management server 95, though one skilled in the art will appreciate other database structures are possible and are included within the scope of the invention. Database 1500 includes cardholder account table 1502, the merchant account table 1504, and the offer purse table 1506. The cardholder account table 1502 includes columns, i.e., fields for data entry, such as the cardholder account number, the purse ID, or purse identification number, the cardholder's balance, the cardholder name, the cardholder email address, the cardholder phone number, the cardholder address, the cardholder birthday, the cardholder demographic data, and the cardholder's offer redemption rate. The merchant account table 1504 includes columns for the purse ID, merchant name, merchant account number, cardholder utilization of the offer, entity account number to debit for charge (if offer in purse not from merchant or merchant affiliated entities), the merchant phone number, and the merchant email address. The offer purse table 1506 includes columns for offer purse identification number, the purse credit, or amount, associated with the purse identification number, the purse expiration date and time, whether the purse was redeemed and a cardholder account number. As one skilled in the art will appreciated, each of these tables may include dependent tables for each of the columns, e.g., the address column for the cardholder account table may be implemented as another table with separate columns for the street, state, and zip code for each cardholder account number. Moreover, database 1500 may include fewer or more data tables and columns depending upon the implementation of the particular embodiment of the invention. Those skilled in the art will understand and recognize that multiple purse ids, and personal information can also be included in the database tables and columns, and that database server can be implemented as a single computer, server, plurality of computers or servers, or as separate component of the fulfillment computer 81.

As shown in FIG. 8A, telecommunications interface 107 allows a cardholder 65, or a merchant (not shown) to connect to the issuer computer using a phone line, or the like, and may be a standard phone network device such as a PBX. As one skilled in the art will appreciate, web server 109 provides the payment network, merchants or service providers and cardholder networked computer access to the issuer network, and is used to manage computer traffic into and away from the issuer 801. As such, web server 109 is configured with processors, memory, and I/O devices to allow efficient exchange of data between the issuer 801, its related components, the open payment network 802, merchant (not shown), and cardholder 65 to facilitate the web functions thereof.

The fulfillment computer 81 performs many of the functions of the system related to offering a discount and associating a discount and transaction to a cardholder account and communicating transaction status to the cardholder 65. In addition to approving transactions, fulfillment computer 81 can also be used to credit an offer purse to a cardholder account stored in memory, e.g., of the fulfillment computer or database, and to send offers to the gift cardholder through the communications network 804. To perform this function, the fulfillment computer 81 may be connected via the communications network 804 to a merchant or merchant computer (not shown) that authorizes certain cardholder account numbers or cardholders for a discount, or the fulfillment computer 81 may have a schedule stored thereon for each cardholder's discount offers for particular stores, transaction types, etc. In addition, the fulfillment computer may associate merchants and cardholder accounts to a particular purse, with a separate entity to be charged the discount amount, i.e., an instance where a shopping center offers a $10 discount to an unaffiliated merchant in a shopping mall.

Figure 14:
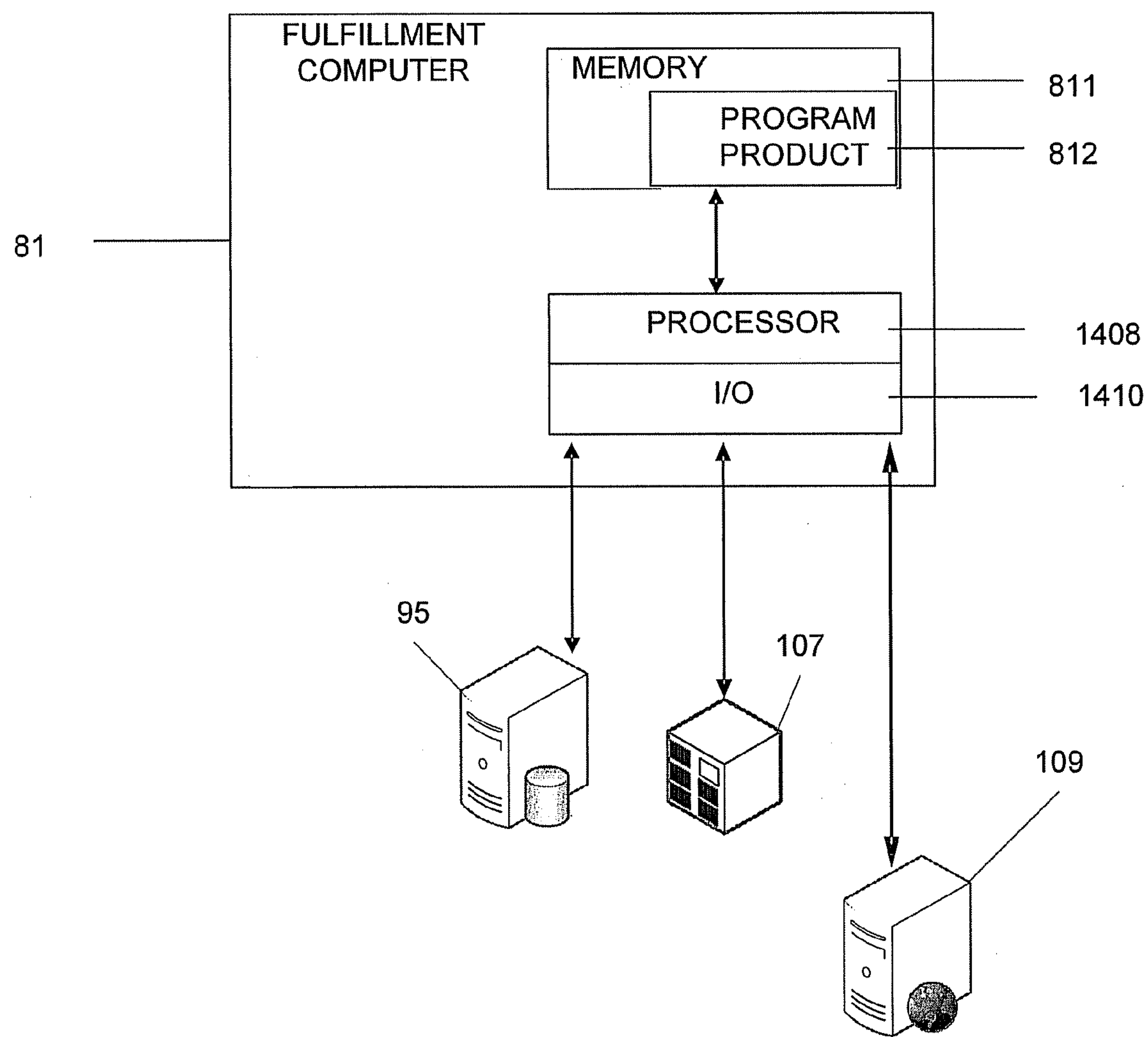
FIG. 14 is a block diagram of an issuer computer having a computer program product according to an exemplary embodiment installed thereon.

As shown in FIG. 14, fulfillment computer 81 can be configured as a computer, a server, or a system of distributed computers or server that at least include memory 811, program product 812, processor 1408, input/output device and ("I/O") 1410. For example, fulfillment computer 81 could be configured as an application server or plurality of application servers connected to the issuer 801 and accessible by a plurality of workstations associated with the issuer 801. I/O device 1410 connects the fulfillment computer 81 to issuer 801, database server 95, telecommunications interface 107, and the web server 109, to thereby allow fulfillment computer 81 to send and receive cardholder and merchant account data. I/O device 1410 can be any I/O device including, but not limited to a network card/controller connected by a PCI bus to the motherboard, or hardware built into the motherboard of the fulfillment computer 81 to connect same to the network.

As can be seen, the I/O device is connected to the processor 1408. Processor 1408 is the "brains" of the fulfillment computer 81, and as such executes program product 812 and works in conjunction with the I/O device 1410, for example, to direct data to memory 811 from the database server 95, telecommunications interface 107, and web server 109, and to send data from memory 811 to the database server 95, telecommunications interface 107, and web server 109. Processor 1408 can be any commercially available processor, or plurality of processors, adapted for use for the fulfillment computer 81, e.g., Intel® Xeon® multicore processors, Intel® micro-architecture Nehalem, AMD Opteron™ multicore processors, etc. As one skilled in the art will appreciate, processor 1408 may also include components that allow the fulfillment computer 81 to be connected to a display [not shown] and keyboard that would allow a user to directly access the processor 1408 and memory.

Memory 811 stores instructions for execution of the program product of exemplary embodiments of the invention on the processor 1408, and in some embodiments may store the contents of database 1500. Memory 811 consists of both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, though memory 811 is depicted on, e.g., the motherboard, of the fulfillment computer 81, memory 811 may also be a separate component or device, e.g., FLASH memory, connected to the fulfillment computer 81. Memory 811 may also store applications that various issuer workstations (not shown) can access and run on the fulfillment computer 81.

It should be understood that the illustrated merchant acquirer computer 803, open payment network 802, and issuer 801, are configured above by way of example and that other types of servers or computers configured according to various other methodologies known to those skilled in the art, can be used. For example, a single computer, a plurality of computers, a server, or server cluster or server farm may be employed, and this disclosure does not limit any configuration of computers and servers for each. Moreover, each may be deployed as at a server farm or server cluster managed by a server host, and the number of servers and their architecture and configuration may be increased based on usage, demand, and capacity requirements for the system 800. In addition, the fulfillment computer 81 can be configured as a separate networked device, server, or network, separate and apart from the issuer.

The operation of the computer program product of the instant invention will now be described with reference to FIGS. 5-7 and 10-13. In an exemplary embodiment, a consumer buys or receives a network-branded, shopping center gift card. The issuer holds the consumer's funds in a purchase purse, or sub-account, associated with the gift card. To receive notice of and be eligible for offers, the consumer registers information, e.g., an e-mail address or mobile phone number for text messages, with the issuer. Then specific participating merchants, e.g., merchants in the shopping center or mall, can choose to present offers to the consumer, now a cardholder. Messages are sent to the cardholder informing the cardholder of promotions and offers to motivate or incentivize the cardholder to thereby drive the cardholder back into participating stores in the shopping center. The issuer holds funds for the offers in one or more offer purses. The offers may be redeemable only for a short period of time, e.g., a predetermined duration, and may be redeemable only at specific merchants as understood by those skilled in the art. To redeem an offer, the cardholder presents the gift card as payment. The offer redemption originates via a card swipe; a standard network transaction is used. The issuer computer recognizes the merchant by information sent in the authorization and automatically processes the transaction. The issuer computer deducts an offer amount from the appropriate offer purse associated with the gift card and deducts the balance from the purchase purse. Thus, the merchant is paid for full price via a standard network settlement process. The issuer computer creates reports that identify redemption by merchant, and settlement for the offer amount is managed accordingly (between the issuer and merchant or sponsor). Also, the issuer can charge additional fees of the merchant for marketing or redemption services.

Exemplary embodiments include providing balance information to the cardholder electronically. To confirm that a $4.95 transaction used only $1.95 from the purchase purse and $3 from an offer purse, a cardholder can make a balance inquiry. If the merchant supports a balance inquiry feature, the merchant can supply the cardholder with the balance on the gift card, e.g., the balance corresponding to the balance in the purchase purse, perhaps even automatically on the receipt. Some merchants, however, do not currently support a balance inquiry feature. Thus, in those situations, the issuer can push, or send, the purchase purse balance on the gift card to the cardholder electronically, such as, via a text message, or through other mechanisms as understood by those skilled in the art to confirm eligibility of the offer.

Figure 5:
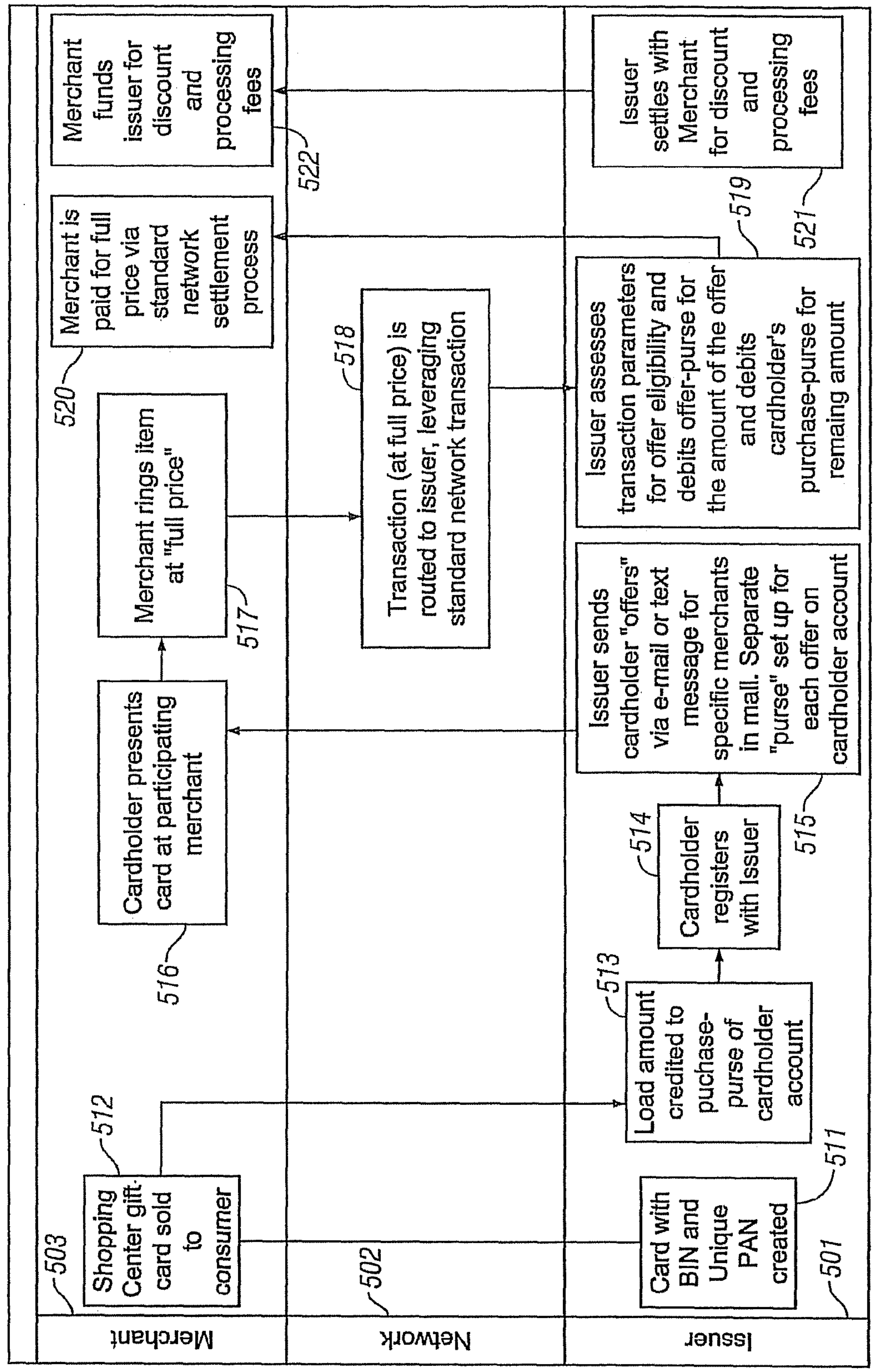
FIG. 5 is a schematic block diagram of a fulfillment system utilizing a gift card according to an exemplary embodiment.

As illustrated in FIG. 5, an exemplary embodiment can include an offer fulfillment system utilizing a gift card, including a card issuer 501, an open payment network 502, and a merchant 503. The issuer 501 creates a card, e.g., a shopping center gift card, with a BIN and a cardholder account number (PAN) (511). The gift card is delivered to a merchant 503. The merchant 503 sells the gift card to a consumer (512). Other embodiments include alternate ways for a consumer to obtain a gift card and become a cardholder, including a consumer being given a gift card as a gift from another consumer or as part of a promotion or offer from a merchant as understood by those skilled in the art. The issuer can load the gift card with an amount credited to a purchase purse of the cardholder account (513). Next, the cardholder registers with the issuer (514). That is, the cardholder provides the issuer of the gift card with registration data, including contact information, such as, a phone number for text messages, an email address, or other address using network 502. The cardholder can also provide demographic information as registration data, as understood by those skilled in the art. Then the issuer 501 sends the cardholder offers via e-mail or text message for specific merchants in shopping center, or mall, and sets up a separate purse for each offer on the cardholder account (515). To take advantage of the offer, the cardholder presents the gift card as a form of payment to the merchant referenced in an offer (516). No coupons are necessary. No change to the merchant's POS terminal is necessary. And there is no general or untargeted mass discounting. Next, the merchant 503 rings up an item or items at full price (517). The transaction (at full price) is routed to the issuer 501 by the network 502, using a standard network transaction (518). The issuer 501 accesses the transaction parameters for offer eligibility, debits the offer purse for the amount of the offer, and debits the purchase purse for any remaining amount (519). Then the merchant 503 is paid for the full price via a standard network settlement process (520). Next, the issuer 501 settles with the merchant 503 for discount and processing fees (521), and the merchant 503 funds the issuer 501 for discount and processing fees (522).

Exemplary embodiments also include the use of the gift card to redeem offers, rebates, discounts, or promotions in conjunction with another form of payment. If the gift card is without a purchase purse, the merchant can employ a split tender process and tender the gift card as the initial form of payment. In a partial authorization scenario, the full transaction amount with the partial authorization flag is routed to the issuer. The issuer then accesses the transaction parameters for offer eligibility, debits the offer purse for the amount of the offer, and responds with partial authorization approval for the amount of the offer. Alternately, in a standard authorization scenario, the offer amount is routed to the issuer, leveraging a standard network transaction. The issuer then accesses the transaction parameters for offer eligibility, debits the offer purse for the amount of the offer, and responds with approval for the amount of the offer. In either scenario, the merchant receives approval for the offer amount and prompts for a form of payment for the net remaining balance.

As illustrated in FIG. 6, an exemplary embodiment can include an offer fulfillment system utilizing a gift card for partial authorization in a split tender process, including a card issuer 601, an open payment network 602, and a merchant 603. The issuer 601 creates a card, e.g., a shopping center gift card, with a BIN and a PAN (611). The card is delivered to a merchant 603. The merchant 603 provides the shopping center gift card to a consumer (612). Next, the cardholder registers with the issuer (613). That is, the cardholder provides the issuer of the gift card with contact information, such as, a phone number for text messages, an email address, or other address as understood by those skilled in the art. The cardholder can also provide demographic information as understood by those skilled in the art. Then the issuer 601 sends the cardholder offers via e-mail or text message for specific merchants in the shopping center, or mall, and sets up a separate purse for each offer on the cardholder account (614). To take advantage of the offer, the cardholder presents the gift card during payment to the merchant referenced in an offer (615). No coupons are necessary. No change to the merchant's POS terminal is necessary. And there is no general or untargeted mass discounting. Next, the merchant 603 uses a split tender process and tenders the gift card as the first form of payment (616). The full transaction amount with a partial authorization flag is routed to the issuer 601 by the network 602, using a standard network transaction (617). The issuer 601 accesses the transaction parameters for offer eligibility, debits the offer purse for the amount of the offer, and responds with partial authorization approval for the amount of the offer (618). Then the merchant 603 receives partial authorization for the amount of the offer and prompts for a form of payment for the net remaining balance (619). Next, the issuer 601 settles with the merchant 603 for discount and processing fees (620), and the merchant 603 funds the issuer 603 for discount and processing fees (621).

As illustrated in FIG. 7, an exemplary embodiment can include an offer fulfillment system utilizing a gift card with a standard authorization in a split tender process, which is similar to the partial authorization scenario illustrated in FIG. 6. In the standard authorization example, the merchant 703 uses a split tender process and tenders the gift card as the first form of payment for the offer amount (716). The offer amount is routed to the issuer 701 by the network 702, using a standard network transaction (717). The issuer 701 accesses the transaction parameters for offer eligibility, debits the offer purse for the amount of the offer, and responds with approval for the amount of the offer (718). Next, the merchant 703 receives approval for the amount of the offer and prompts for a form of payment for the net remaining balance (719).

Exemplary embodiments provide tremendous flexibility for offers, discounts, and promotions. Exemplary embodiments include providing a promotion to an individual cardholder or to a collection of individual cardholders according to the desires and goals of the sponsor or issuer. Exemplary embodiments allow the issuer (or sponsor) to target a promotion with great specificity and to analyze the effectiveness of the promotion. For example, a promotion could be sent to unmarried males, aged 25 through 28, with a balance on the gift card greater than $50. Exemplary embodiments further include time-and-date-dependent promotions, such as, a discount for purchases made Monday through Thursday between 10 A.M. and 2 P.M., or a discount for purchases made on Tuesdays in January. Moreover, exemplary embodiments allow the issuer to provide promotions in response to a cardholder's actions. For example, after several purchases using the gift card over a few hours, the issuer can offer the cardholder a discount on food and drink, such as, at an ice cream parlor or coffee shop. Furthermore, notification of a promotional offer or discount can be sent by text message, by e-mail, by automated phone call, by voice message, by postal mail, by general advertisement (including newspapers and billboards), and other mechanisms as understood by those skilled in the art.

As illustrated in FIG. 10, exemplary embodiments provide for a method 1000 of fulfilling a promotional offer utilizing a gift card. The method can include issuing a card having a BIN and a unique cardholder account number so that the gift card can be distributed to a cardholder 1001. The method can include crediting a first amount to a first purse associated with the unique cardholder account number defining a purchase purse 1002. The method can include receiving cardholder registration information by the issuer 1003. The method can include crediting a second amount associated with a promotional offer to a second purse associated with the unique cardholder account number defining an offer purse 1004. The method can include sending the promotional offer to the cardholder electronically responsive to the cardholder registration information 1005. The method can include receiving a standard network transaction responsive to a cardholder presenting the gift card at a participating merchant 1006. The method can include assessing transaction parameters for offer eligibility 1007. The method can include debiting the offer purse associated with the unique cardholder account number for the amount of the offer 1008. The method can include debiting the purchase purse associated with the unique cardholder account number for any remaining amount 1009. The method can include paying the merchant full price via a standard network settlement process 1010. The method can include providing balance information to the cardholder electronically 1011. The method can include settling with the merchant for discount and processing fees 1012.

As illustrated in FIG. 11, exemplary embodiments provide for a method 1100 of fulfilling a promotional offer utilizing a gift card. The method can include issuing a card having a bank identification number and a unique cardholder account number so that the gift card can be distributed to a cardholder 1101. The method can include receiving cardholder registration information by the issuer 1102. The method can include crediting an amount associated with a promotional offer to an offer purse associated with the unique cardholder account number 1103. The method can include sending the promotional offer to the cardholder electronically responsive to the cardholder registration information 1104. The method can include receiving a standard network transaction responsive to a cardholder presenting the gift card at a participating merchant 1105. The method can include assessing transaction parameters for offer eligibility 1106. The method can include debiting the offer purse associated with the unique cardholder account number for the amount of the offer 1107. The method can include responding with approval for the amount of the offer 1108. The method can include paying the merchant the amount of the offer via a standard network settlement process 1109. The method can include settling with merchant for any discount 1110.

As illustrated in FIG. 12, exemplary embodiments provide for a method 1200 of fulfilling a promotional offer utilizing a gift card. The method can include maintaining one or more offer purses associated with a gift card having a bank identification number and a unique cardholder account number 1201. The method can include maintaining a purchase purse associated with the gift card 1202. The method can include sending electronically a promotional offer to a cardholder of the gift card responsive to the cardholder registration information 1203. The method can include receiving a standard network transaction responsive to a cardholder presenting the gift card at a participating merchant as a form of payment 1204. The method can include assessing transaction parameters for offer eligibility 1205. The method can include debiting one of the one or more offer purses associated with the gift card for the amount of the promotional offer 1206. The method can include debiting the purchase purse associated with the gift card for any remaining amount of the transaction 1207. The method can include providing balance information for the purchase purse to the cardholder electronically 1208.

As illustrated in FIG. 13, exemplary embodiments provide for a computer program product 1300, stored on a tangible computer readable memory media 1302, operable on a computer 1301, the computer program product comprising a set of instructions 1303 that, when executed by the computer 1301, cause the computer to perform various operations. The operations can include maintaining one or more offer purses associated with a gift card having a bank identification number and a unique cardholder account number (1304). The operations can also include maintaining a purchase purse associated with the gift card (1305). The operations can include sending electronically a promotional offer to a cardholder of the gift card responsive to the cardholder registration information (1306). The operations can include receiving a standard network transaction responsive to a cardholder presenting the gift card at a participating merchant as a form of payment (1307). The operations can include assessing transaction parameters for offer eligibility (1308). The operations can include debiting one of the one or more offer purses associated with the gift card for the amount of the promotional offer (1309). The operations can also include debiting the purchase purse associated with the gift card for any remaining amount of the transaction (1310). The operations can include providing balance information for the purchase purse to the cardholder electronically (1311).

Other embodiments can include, for example, an offer fulfillment computer 81 to perform a process of activating an offer purse associated with a gift card and satisfying at least in part from the offer purse a standard transaction approval request utilizing the gift card 400 as a form of payment. The offer fulfillment computer 81 can include, for example, a processor positioned to activate an offer purse associated with a gift card. The offer fulfillment computer can include, for example, an input-output interface to notify a cardholder of a promotional offer available through the gift card and to receive a standard transaction approval request responsive to the cardholder presenting the gift card at a participating merchant as a form of payment. The offer fulfillment computer can include, for example, a memory 811 having stored therein a computer program product 812. The computer program product 812 can be stored on a tangible computer memory media 811, operable on the processor, and include a set of instructions that, when executed by the processor, cause the offer fulfillment computer to satisfy at least in part from the offer purse a standard transaction approval request utilizing the gift card as a form of payment by performing various operations. The operations can include, for example, activating, by the processor, an offer purse associated with a gift card having a bank identification number and a unique cardholder account number. The offer purse can be a sub-account associated with a promotional offer. The operations can include, for example, notifying, by the processor through the input-output interface, a cardholder of the promotional offer available through the gift card. The operations can include, for example, matching, in memory, the offer purse to a standard transaction approval request responsive to the cardholder presenting the gift card at a participating merchant as a form of payment. The operations can include, for example, determining, by the processor, eligibility for the promotional offer responsive to transaction parameters from the standard transaction approval request. The operations can include, for example, updating, in memory, an amount associated with the offer purse responsive to the promotional offer to thereby satisfy at least in part from the offer purse the standard transaction approval request.

Embodiments can include, for example, a computer-implemented method of fulfilling a promotional offer utilizing a gift card 400 and an offer fulfillment computer 81. The computer-implemented method can include, for example, activating, by a processor, an offer purse associated with a gift card having a bank identification number and a unique cardholder account number. The computer-implemented method can include, for example, notifying, by the processor through an input-output interface, a cardholder of the promotional offer available through the gift card. The computer-implemented method can include, for example, matching, in memory, the offer purse to a standard transaction approval request responsive to the cardholder presenting the gift card at a participating merchant as a form of payment. The computer-implemented method can include, for example, determining, by the processor, eligibility for the promotional offer responsive to transaction parameters from the standard transaction approval request. The computer-implemented method can include, for example, updating, in memory, an amount associated with the offer purse responsive to the promotional offer to thereby satisfy at least in part from the offer purse the standard transaction approval request.

A person having ordinary skill in the art will recognize that various types of memory are readable by a computer such as described herein, e.g., merchant acquirer computer, issuer computer, database server, web server, fulfillment computer, or other computers with embodiments of the present invention. In addition to that described above the computer readable media, or memory, for each includes but is not limited to: nonvolatile, hard-coded type media such as read only memories (ROMs), CD-ROMs, and DVD-ROMs, or erasable, electrically programmable read only memories (EEPROMs), recordable type media such as floppy disks, CD-R/RWs, DVD-RAMs, DVD-R/RWs, DVD+R/RWs, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the bank to store program products, e.g., including software, thereon.

This application claims priority to and the benefit of: U.S. Provisional Patent Application Ser. No. 61/109,022, by Galit et al., titled "Shopping Center Gift Card Offer Fulfillment System, Program Product, and Associated Methods" filed Oct. 28, 2008, which is incorporated herein by reference in its entirety.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A machine to activate an offer purse associated with a gift card, promotional offer, and cardholder and to deduct a predetermined portion of a transaction amount from the offer purse, the machine comprising:

one or more processors positioned to execute a computer program stored in a non-transitory computer medium accessible by the one or more processors, the computer program being executed to perform the steps of:

activating the offer purse associated with the gift card, the promotional offer, and the cardholder, the gift card having a bank identification number and a unique cardholder account number, and the unique cardholder account number being associated with the offer purse and a purchase purse for holding funds of the cardholder that are attributable to purchases made with the gift card;

crediting the predetermined portion of the transaction amount associated with the promotional offer to the offer purse, the offer purse holding the predetermined portion of the transaction amount so that the predetermined portion can be deducted when the promotional offer is fulfilled using the gift card;

notifying the cardholder of the promotional offer associated with the over purse and the gift card;

determining, responsive to a transaction request from a merchant when use of the gift card occurs, whether the offer purse associated with the gift card is associated with the transaction request; and deducting, responsive to determining that the transaction request is associated with the offer purse, the predetermined portion of the transaction amount from the offer purse and a remaining portion of the transaction amount from the purchase purse.

2. A machine as claimed in claim 1, wherein the transaction request involves the transaction amount with a partial authorization flag.

3. A machine as claimed in claim 1, wherein the transaction request involves a split tender process with the gift card as an initial form of payment.

4. A machine as claimed in claim 1, wherein the step of activating the offer purse associated with the gift card, the promotional offer, and the cardholder is responsive to a receipt of cardholder registration data, the cardholder registration data including demographic information and preferences so that the promotional offer is tailored to the cardholder.

5. A machine as claimed in claim 1, wherein the steps further include:

notifying the cardholder of balance information for the purchase purse and the offer purse associated with the gift card.

6. A machine as claimed in claim 1, wherein the step of notifying the cardholder of the promotional offer available through the gift card involves a text message to a telephone number associated with the cardholder.

7. A machine as claimed in claim 1, wherein the gift card is a shopping center gift card so that sponsors of the promotional offer at least one of a group selected from a shopping center management company and a merchant having a location at the shopping center; and wherein the promotional offer is a dynamic offer available for a predetermined duration.

8. A machine as claimed in claim 7, wherein the dynamic offer is responsive to gift card transaction activity at shopping center.

9. A computer program product, stored on a non-transitory tangible computer memory media, operable on a computer, the computer program product comprising a set of instructions that, when executed by the computer, cause the computer to perform a process to notify a cardholder, associated with a gift card, of a promotional offer associated with an offer purse and the gift card and to deduct a predetermined portion of a transaction amount from the offer purse, the computer program product performing the steps of:

activating the offer purse associated with the gift card, the promotional offer, and the cardholder, the gift card having a bank identification number and a unique cardholder account number, and the unique cardholder account number being associated with the offer purse and a purchase purse for holding funds of the cardholder that are attributable to purchases made with the gift card;

crediting the predetermined portion of the transaction amount associated with the promotional offer to the offer purse, the offer purse holding the predetermined portion of the transaction amount, so that the predetermined portion can be deducted when the promotional offer is fulfilled using the gift card;

notifying the cardholder of the promotional offer associated with the offer purse and the gift card;

determining, responsive to a transaction request from a merchant when use of the gilt card occurs, whether the offer purse associated with the gift card is associated with the transaction request; and deducting, responsive to determining that the transaction request is associated with the offer purse, the predetermined portion of the transaction amount from the offer purse and a remaining portion of the transaction amount from the purchase purse.

10. A computer program product as claimed in claim 9, wherein the transaction request involves the transaction amount with a partial authorization flag.

11. A computer program product as claimed in claim 9, wherein the transaction request involves a split tender process with the gift card as an initial form of payment.

12. A computer program product as claimed in claim 9, wherein the step of activating the offer purse associated with the gift card, the promotional offer, and the cardholder is responsive to a receipt of cardholder registration data, the cardholder registration data including demographic information and preferences so that the promotional offer is tailored to the cardholder.

13. A computer program product as claimed in claim 9, wherein the step of notifying the cardholder of the promotional offer available through the gift card involves a text message to a telephone number associated with the cardholder.

14. A computer-implemented method for causing a computer to perform a process to notify a cardholder, associated with a gift card, of a promotional offer associated with an offer purse and the gift card and to deduct a predetermined portion of a transaction amount from the offer purse, the computer-implemented method comprising:

activating the offer purse associated with the gift card, the promotional offer, and the cardholder, the gift card having a bank identification number and a unique cardholder account number, and the unique cardholder account number being associated with the offer purse and a purchase purse for holding hinds of the cardholder that are attributable to purchases made with the gift card;

crediting the predetermined portion of the transaction amount associated with the promotional offer to the offer purse, the offer purse holding the predetermined portion of the transaction amount so that the predetermined portion can be deducted when the promotional offer is fulfilled using the gift card;

notifying the cardholder of the promotional offer associated with the over purse and the gift card;

determining, responsive to a transaction request from a merchant when use of the gift card occurs, whether the offer purse associated with the gift card is associated with the transaction request; and deducting, responsive to determining that the transaction request is associated with the offer purse, the predetermined portion of the transaction amount from the offer purse and a remaining portion of the transaction amount from the purchase purse.

15. A computer-implemented method as claimed in claim 14, wherein the transaction request involves the transaction amount with a partial authorization flag.

16. A computer-implemented method as claimed in claim 14, wherein the transaction request involves a split tender process with the gift card as an initial form of payment.

17. A computer-implemented method as claimed in claim 14, wherein activating the offer purse associated with the gift card, the promotional offer, and the cardholder is responsive to a receipt of cardholder registration data, the cardholder registration data including demographic information and preferences so that the promotional offer is tailored to the cardholder.

18. A computer-implemented method as claimed in claim 14, wherein the method further comprises:

notifying the cardholder of balance information for the purchase purse and the offer purse associated with the gift card.

19. A computer-implemented method as claimed in claim 14, wherein notifying the cardholder of the promotional offer available through the gift card involves a text message to a telephone number associated with the cardholder.

20. A computer-implemented method as claimed in claim 19, wherein the gift card is a shopping center gift card so that sponsors of the promotional offer at least one of a group selected from a shopping center management company and a merchant having a location at the shopping center; and wherein the promotional offer is a dynamic offer available for a predetermined duration.

* * * * *